US006952876B2

(12) United States Patent
Frazer

(10) Patent No.: US 6,952,876 B2
(45) Date of Patent: Oct. 11, 2005

(54) PLANT CLIPPER WITH CHEMICAL DISPENSER

(76) Inventor: David S. Frazer, 1466 M63, Benton Harbor, MI (US) 49022

( * ) Notice: Subject to any disclaimer, the term of this patent is extended or adjusted under 35 U.S.C. 154(b) by 0 days.

(21) Appl. No.: 10/440,828

(22) Filed: May 19, 2003

(65) Prior Publication Data
US 2003/0213132 A1 Nov. 20, 2003

Related U.S. Application Data
(60) Provisional application No. 60/381,589, filed on May 17, 2002.

(51) Int. Cl.$^7$ ................................................ A01G 3/00
(52) U.S. Cl. ............................ 30/123.3; 30/131; 47/1.7
(58) Field of Search ............................... 30/123.3, 131, 30/132, 134, 125; 83/169; 47/12, 1.01 R, 1.7

(56) References Cited

U.S. PATENT DOCUMENTS

| 633,736 | A | * | 9/1899 | Schoonover | ................. 30/134 |
| 773,743 | A | | 11/1904 | Von Hoffmann | |
| 1,056,046 | A | | 3/1913 | Myers | |
| 1,650,948 | A | * | 11/1927 | Long | ........................... 30/135 |
| 1,666,253 | A | * | 4/1928 | Blincoe | ..................... 30/135 |
| 2,671,959 | A | * | 3/1954 | Silberhorn | .................... 30/1.5 |
| 2,747,330 | A | | 5/1956 | Simpkins | |
| 2,870,573 | A | | 1/1959 | Scadden | |
| 4,219,963 | A | | 9/1980 | Mullett | |
| 4,783,907 | A | | 11/1988 | Ravaux | |
| 4,891,882 | A | | 1/1990 | Bloom et al. | |
| 5,088,198 | A | | 2/1992 | Drusiani | |
| 5,606,822 | A | | 3/1997 | Dearhammer | |
| 6,523,264 | B1 | * | 2/2003 | Albert et al. | .............. 30/123.3 |
| 6,647,627 | B2 | * | 11/2003 | Nickel | ......................... 30/135 |

OTHER PUBLICATIONS

Gempler's Catalog # 1501544, p. 192.
KLIPKLEEN Adaptor Kit Instruction Sheet (2 pages).

* cited by examiner

Primary Examiner—Allan N. Shoap
Assistant Examiner—Omar Flores Sánchez
(74) Attorney, Agent, or Firm—John A. Waters; Varnum Riddering Schmidt Howlett LLP

(57) ABSTRACT

A clipper and herbicide or other chemical dispenser comprises a pair of pivotal handle members that are squeezed together to operate a shear mechanism and a chemical dispenser that dispenses chemical directly on the end of the cut stem after the stem has been cut. Preferably, a clamping mechanism clamps a plant stem in place below the shears while the shears cut the stem. The chemical dispenser includes a liquid pump actuated by the handles that pumps a discreet amount of chemical through an opening in a cutting blade at a time when the opening is aligned with the cut end of the plant stem. The dispenser has an outlet mounted on a dispenser arm that is moved away from the opening in the cutting blade by the upper plant stem as the stem is being cut. When the upper stem falls away, the dispenser arm pivots back to align the outlet with the opening in the cutting blade for chemical dispensation on the lower cut stem.

14 Claims, 28 Drawing Sheets

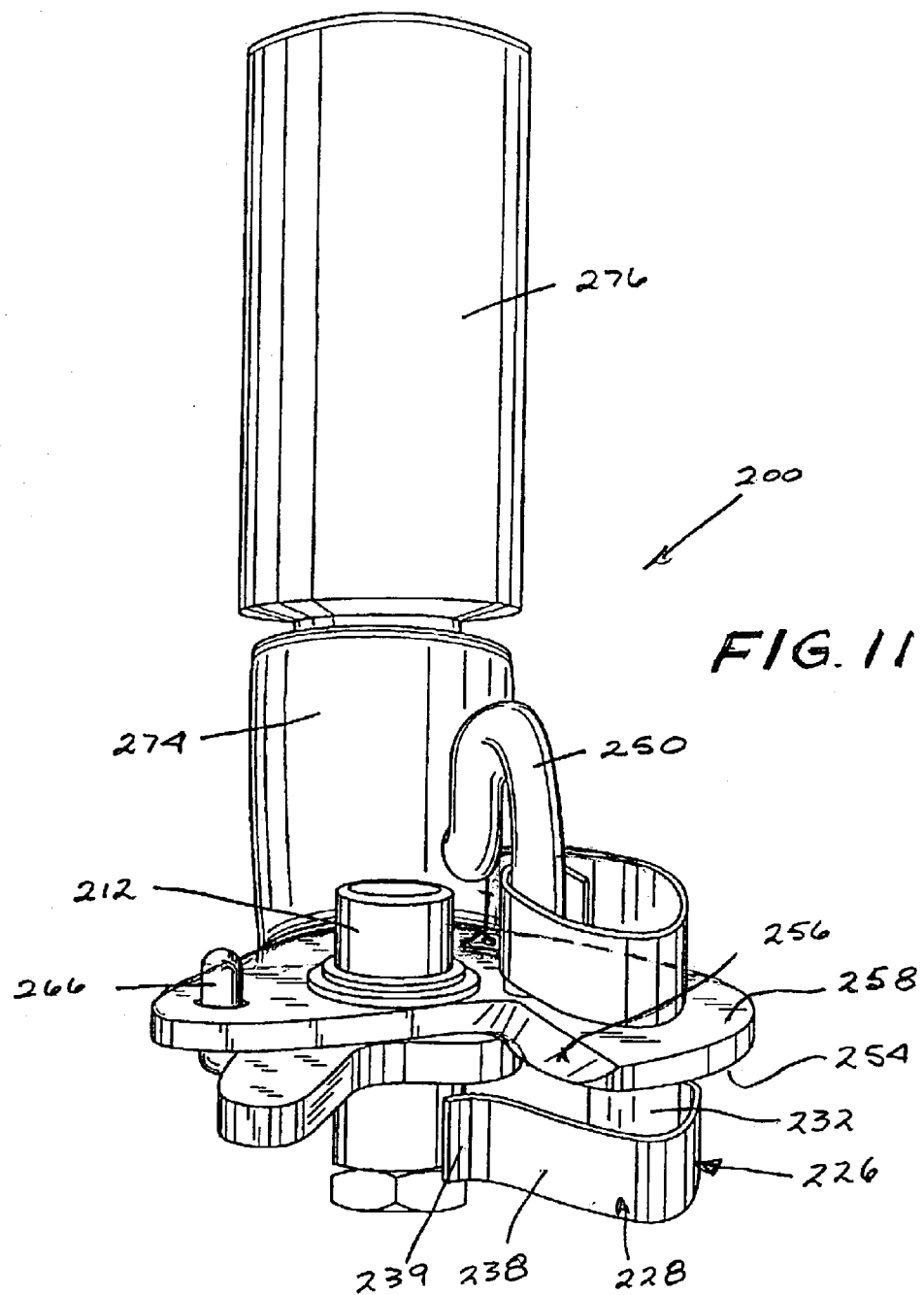

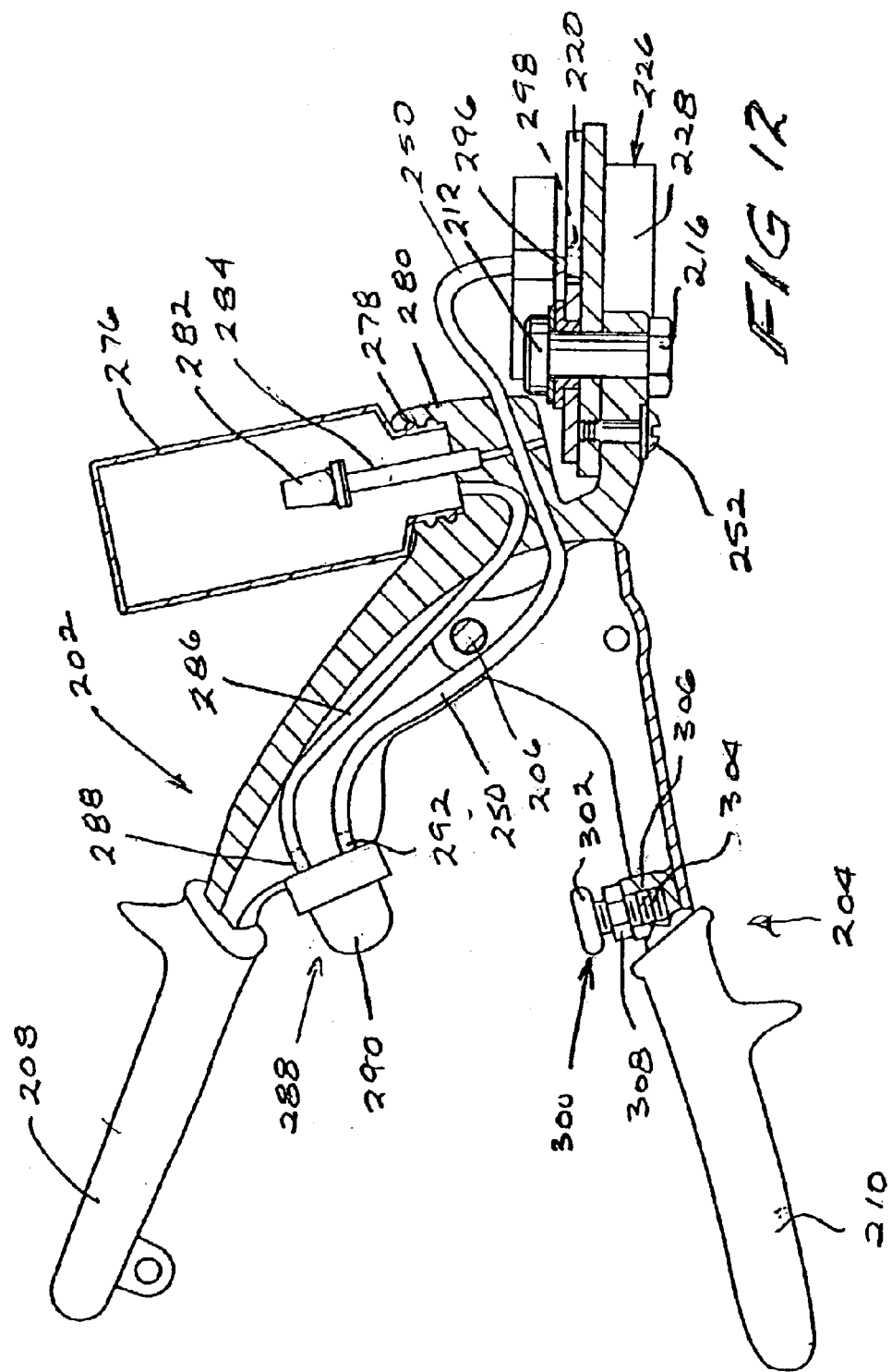

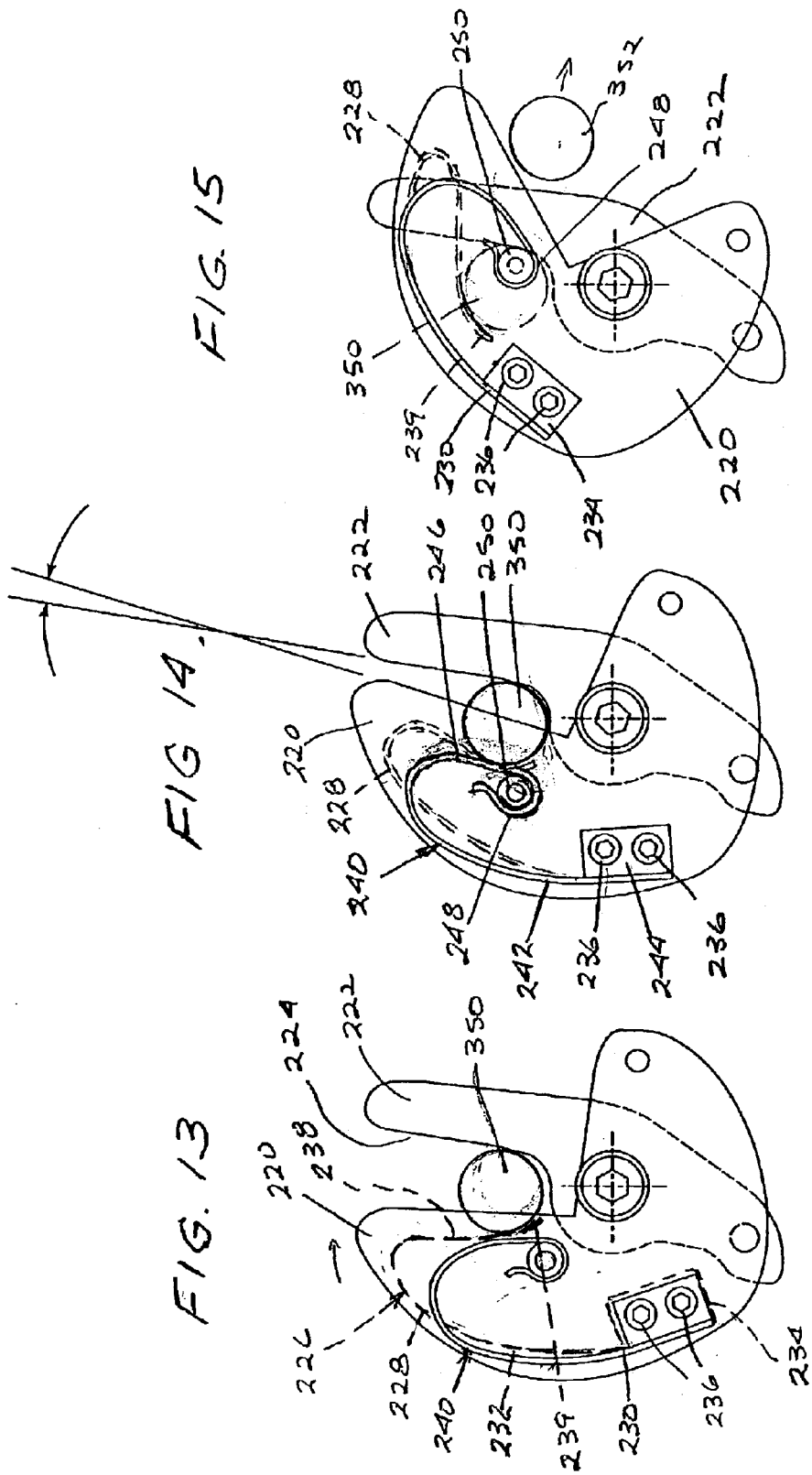

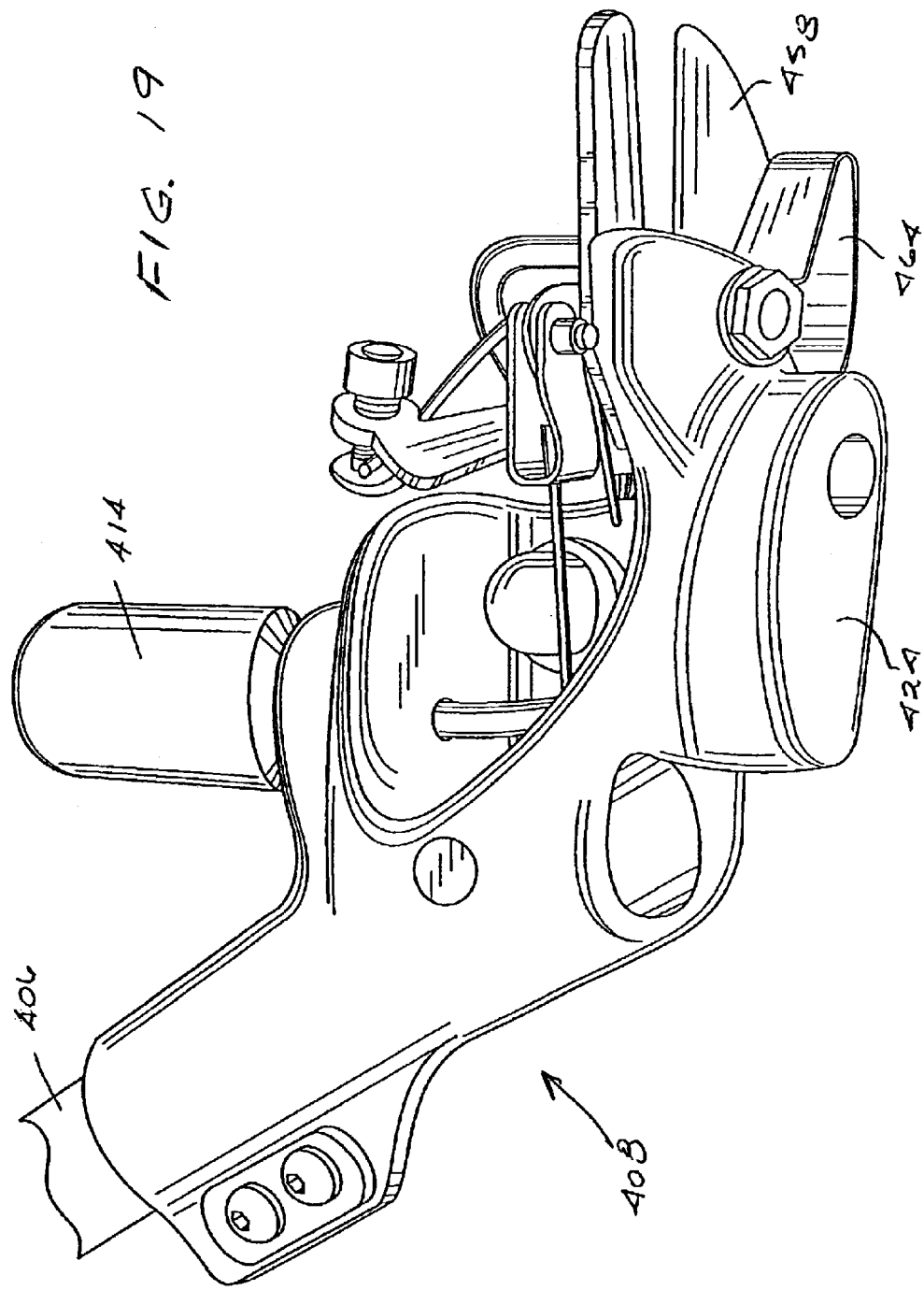

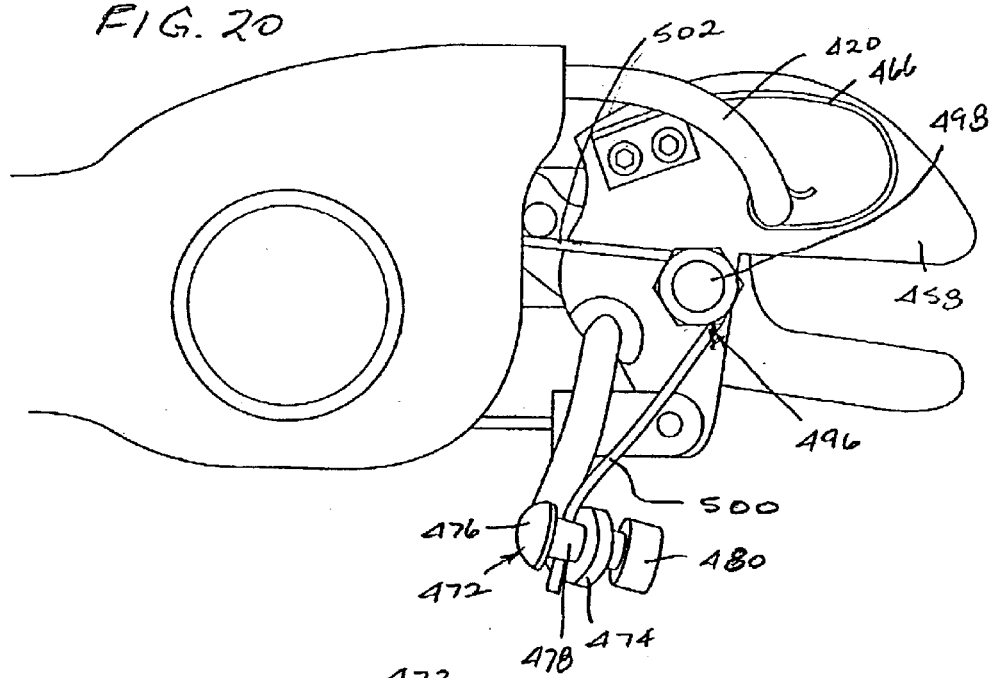
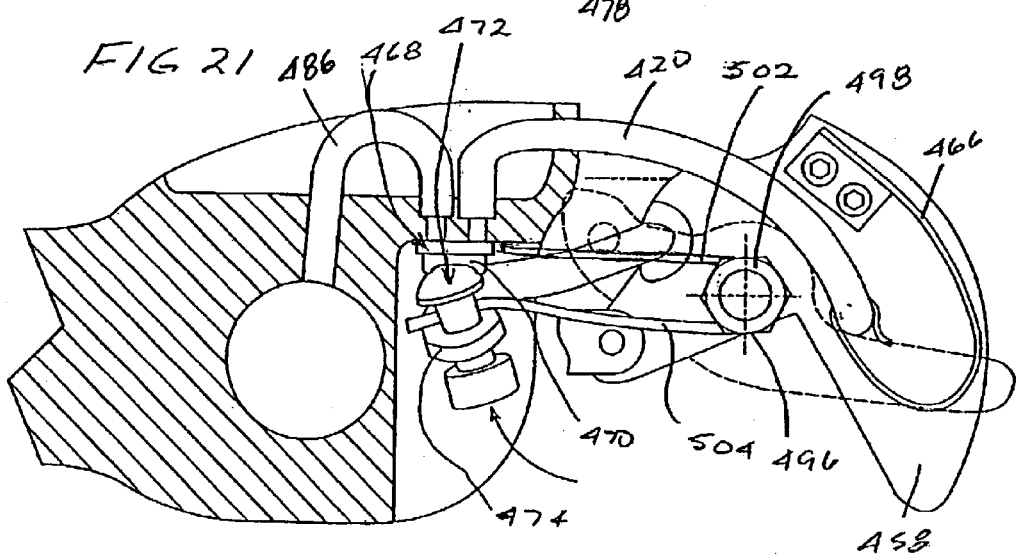

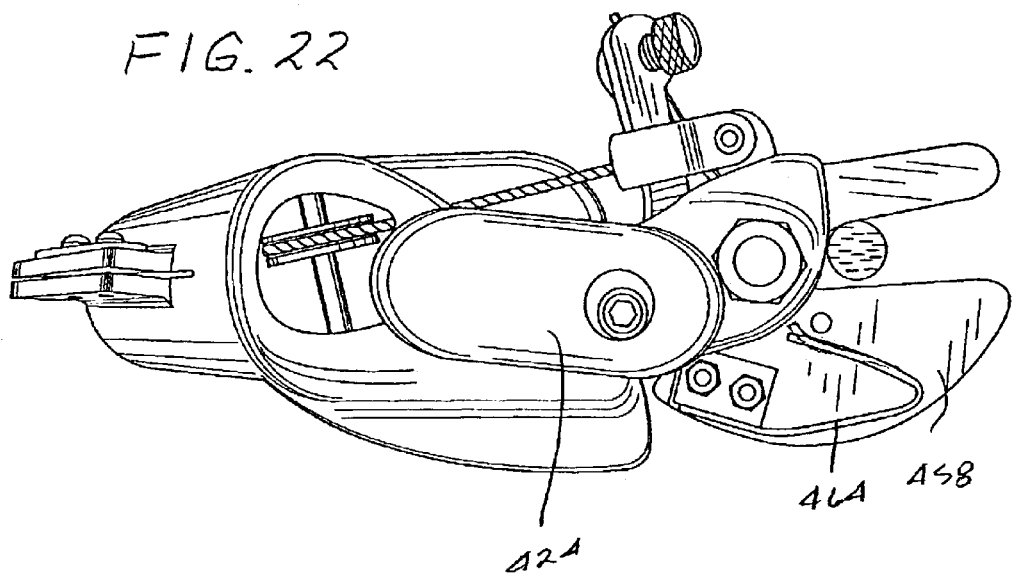
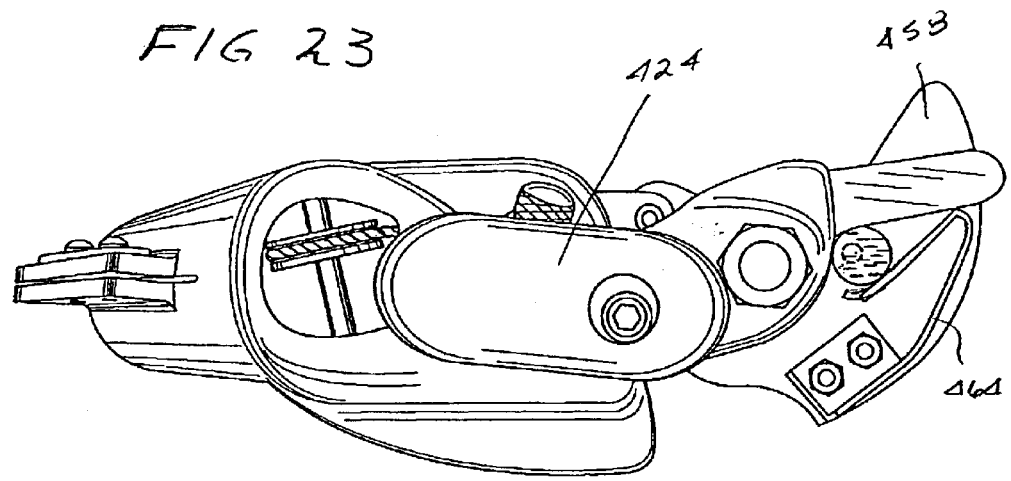

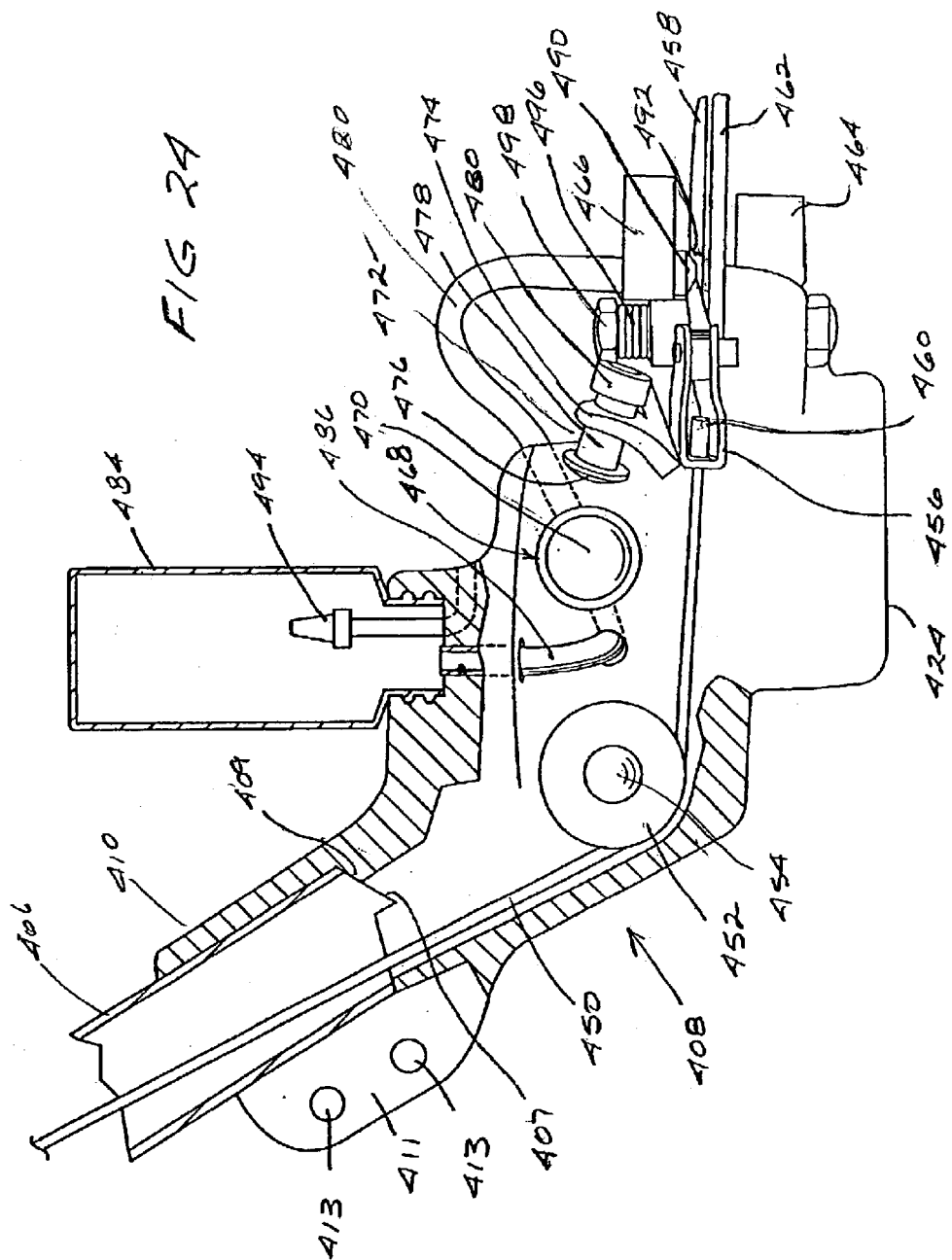

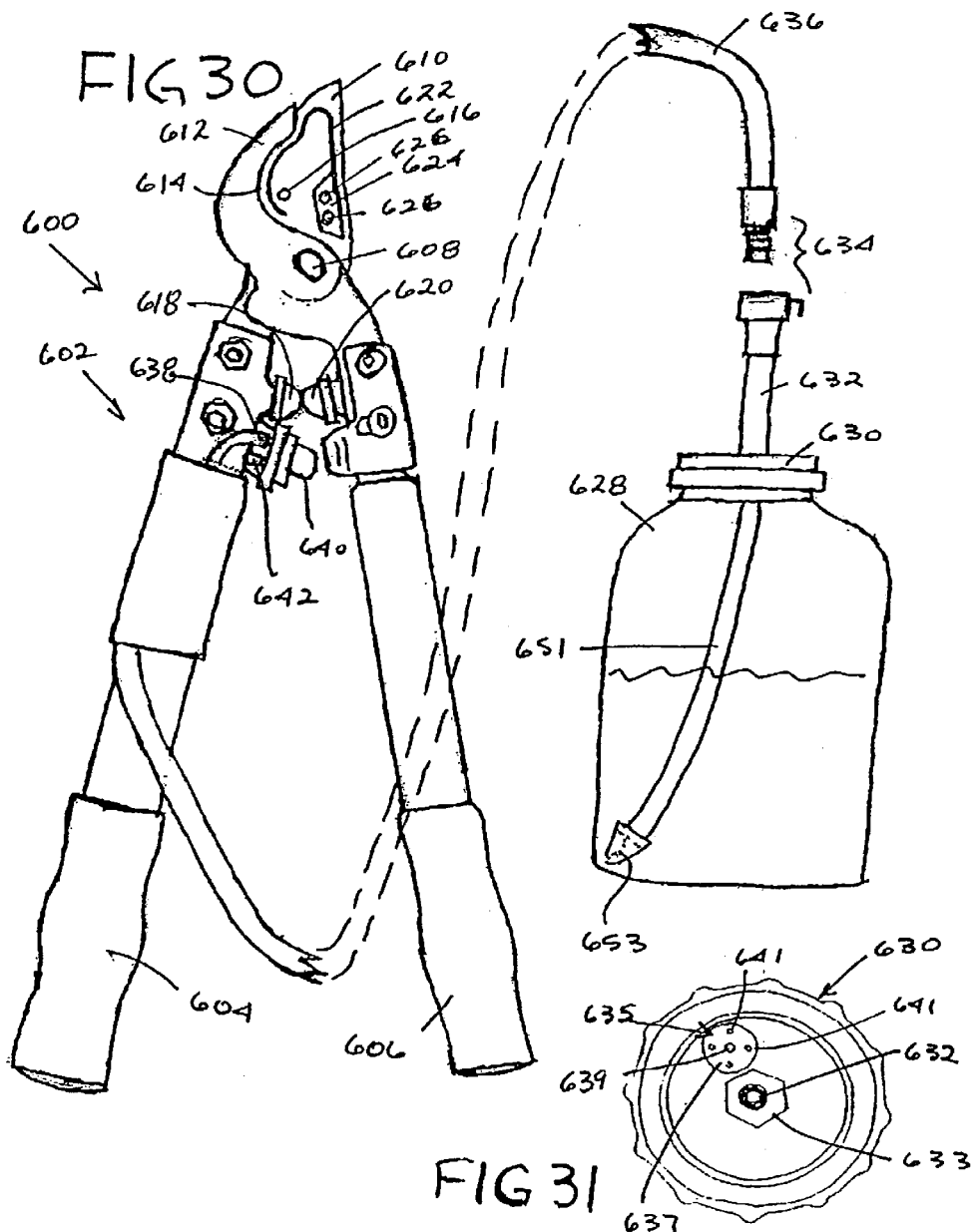

PLANT CLIPPER WITH CHEMICAL DISPENSER

CROSS-REFERENCES TO RELATED APPLICATIONS

This application is based on and claims the priority date of provisional patent application No. 60/381,589, filed on May 17, 2002.

BACKGROUND OF THE INVENTION

The present invention relates in one aspect to a clipper for removing unwanted plants wherein an herbicide is dispensed immediately on the freshly cut stem in order to kill the roots of the plant and prevent the plant from re-growing. The present invention also can be used for dispensing other treatment chemicals, such as fungicide or anti-bacterial chemicals, on a cut plant stem or branch.

The growth of undesired plants, including young bushes and trees, in a garden or elsewhere is a continuous problem. The customary way of eliminating such vegetation is to cut it off as close to the ground as possible. Many times, however, this does not kill the plant. The plant instead develops new shoots. In addition, many plants propagate by tuberous roots and thus continue to spread and send up shoots in a number of locations.

Another method for removing unwanted vegetation is to apply an herbicidal chemical to the vegetation. This is most often done by spray, although it can be accomplished by applying the herbicide directly to the leaves of the plant. A spray presents problems because a spray is not easily restricted to one plant but can drift and contact desired vegetation as well as undesired vegetation. Also, application of an herbicide to the leaves of a plant by spray or otherwise is generally of maximum effectiveness only when plants are rapidly growing and is of lesser effect in drier seasons and when plant growth has stalled.

Combination clippers and chemical dispensers have been developed to apply a plant treatment chemical or an herbicide by means of the clippers, either by applying the chemicals to the clipper blades or by spraying the chemicals in the direction of the fresh cut stem. While a spray may work satisfactorily to some extent for a beneficial treatment chemical, a more precise application is desirable for an herbicide. A more precise application is also desirable for treatment chemicals such as fungicide and anti-bacterial agents.

An object of the present invention is to provide an improved combination clipper chemical applicator for vegetation, particularly discrete plants, wherein an appropriate amount of herbicide or other chemical is squirted directly on the cut in the stem but not on non-selected vegetation.

SUMMARY OF THE INVENTION

In accordance with the present invention, a clipper and herbicide or other chemical dispenser comprises a shear-type blade mechanism for cutting a plant, a pair of pivotal handle members that are squeezed together to operate the shears, and an herbicide or other chemical dispenser that squirts chemical directly on the end of the cut stem of the plant through an outlet immediately after the stem has been cut and while the stem is preferably being held in place by a clamp mechanism incorporated into the clipper mechanism. A liquid pump connected to the handle assembly is automatically actuated when the handles are closed to pump a discreet amount of chemical through the outlet at a time when the outlet is aligned with the cut end of the plant stem. The outlet of the dispenser is mounted on a pivotal dispenser arm that is spring biased over a hole in the cutting blade. The dispenser arm engages the plant stem above the shears and is pivoted away from the cutting blade as the stem is being cut, allowing the blade to pass clearly through the stem. Thereafter, the cut plant stem falls away and the dispenser arm pivots back to align the outlet with the hole in the cutting blade for chemical dispensation.

In one aspect of the present invention, the clipper has vertically pivotal handles that actuate horizontally pivotal blades and clamping mechanism, with the blades and handle being resiliently biased toward their open position. The reference to horizontal and vertical orientation is intended to show the relative positions of the components in their positions in use for cutting a vertical stem. The clippers can be oriented in other directions. The clamping mechanism also desirably includes an indentation for holding a plant stem in a proper position for chemical dispensation.

The chemical dispenser of the present invention can include a separate liquid storage container having a top covered by a removable cap. The cap has an air inlet and a liquid outlet. An interior feed tube extends to the cap outlet from a weighted inlet end that sinks to the bottom of the liquid in the container. The weighted inlet end causes the feed tube inlet always to be submerged below the liquid level in the container, even when the container is oriented in different directions. The cap also includes a one way air inlet valve that permits air to be drawn into the container to equalize pressure but prevents liquid from flowing out of the container through the air inlet. A conventional duck bill type of spring leaf closure or umbrella valve is desired for the air inlet.

An alternative liquid storage container is mounted in an inverted position to the clipper adjacent the blades.

The present invention can employ handles immediately adjacent the blades or can employ a long handle that permits use of the clipper by a person who is standing. A foot at the bottom of the clipper can support the blades above the ground and protect the blades from contact with soil and sand during use.

In other aspects of the present invention, the clipper can be conventional hand clippers or loppers.

These and other features and advantages of the present invention are described below and shown in the appended drawings, in connection with a description of the preferred embodiment of the present invention.

BRIEF DESCRIPTION OF THE DRAWINGS

FIG. 4 is a plan view of the clamp and cutting blades showing the insertion of a plant stem into the clipper prior to actuation of the clippers.

FIG. 5 shows the clamp engaged with the plant stem as the clipping action is commenced, with the upper cutting blade still being spaced away from the stem.

FIG. 11 is a front perspective view of the embodiment of FIG. 9.

FIG. 12 is a side elevational view, shown partly in section, of the embodiment of FIG. 9.

FIGS. 13, 14, and 15 are fragmentary plan views showing the motion of the blades of the embodiment of FIG. 9 at three different stages in cutting a stem of a plant.

FIG. 19 is a perspective view of the clipper assembly of FIG. 16, shown from a lower right side.

FIG. 20 is a fragmentary plan view of the clipper assembly of FIG. 16, showing the blades in an open position.

FIG. 21 is a partially sectional view as in FIG. 20, showing the blades in a closed position.

FIG. 22 is a bottom perspective plan view of the clipper assembly of FIG. 20, showing a stem inserted between the blades of the clipper assembly and the blades being open.

FIG. 23 is a view as in FIG. 22 wherein the blades are closed.

FIG. 24 is a side elevational view of the clipper assembly of FIG. 16, shown partially in section.

FIG. 30 is plan view of a fifth embodiment of the present invention, wherein the clippers are loppers.

FIG. 31 is a view of the inner side of the lid of the chemical container shown in FIG. 30.

DETAILED DESCRIPTION OF PREFERRED EMBODIMENT

Figure 1:
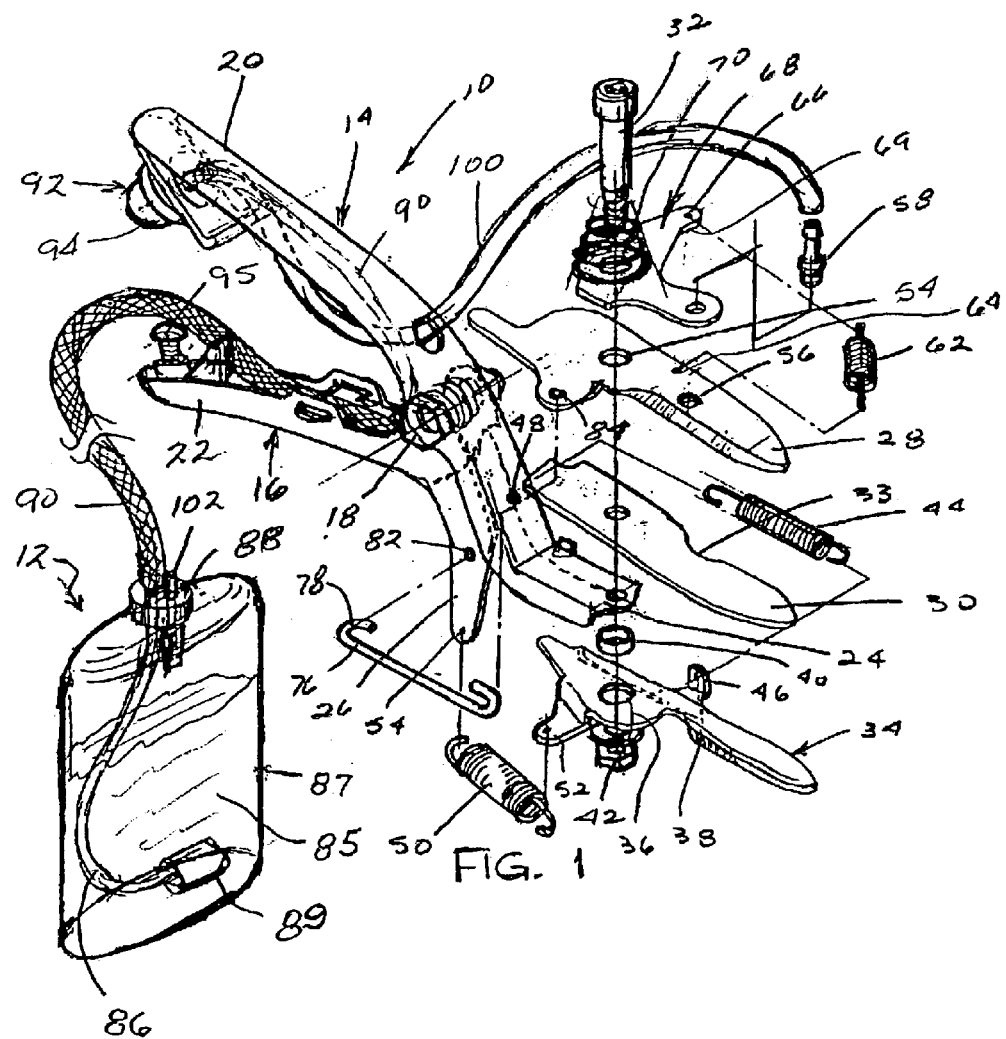
FIG. 1 is an exploded perspective view of a clipper and liquid chemical dispenser in accordance with one embodiment of the present invention.

Referring now to the drawings, a plant clipper 10 incorporating an herbicide or other liquid chemical dispenser 12 is shown in exploded view in FIG. 1. Plant clipper 10 comprises a pair of vertically movable handle members 14 and 16 pivotally mounted together by bolt 18 at a position intermediate the ends. The outer ends of the handles 20 and 22 constitute hand grips, while inner ends 24 and 26 of the handles constitute actuating members for operating the blades and clamp of the present invention. An upper cutting blade 28 is pivotally mounted by a bolt 32 on the upper side of inner end 24 of the handle member 14. The upper blade is sharpened. The lower blade 30 has a squared edge and includes an indented portion 33 that serves to receive and engage one side of a plant stem. Indented portion 33 has a vertical surface that engages and holds the side of the plant stem below where upper blade 28 severs the stem as it pivots across the lower blade.

Figures 2, 3, 6:
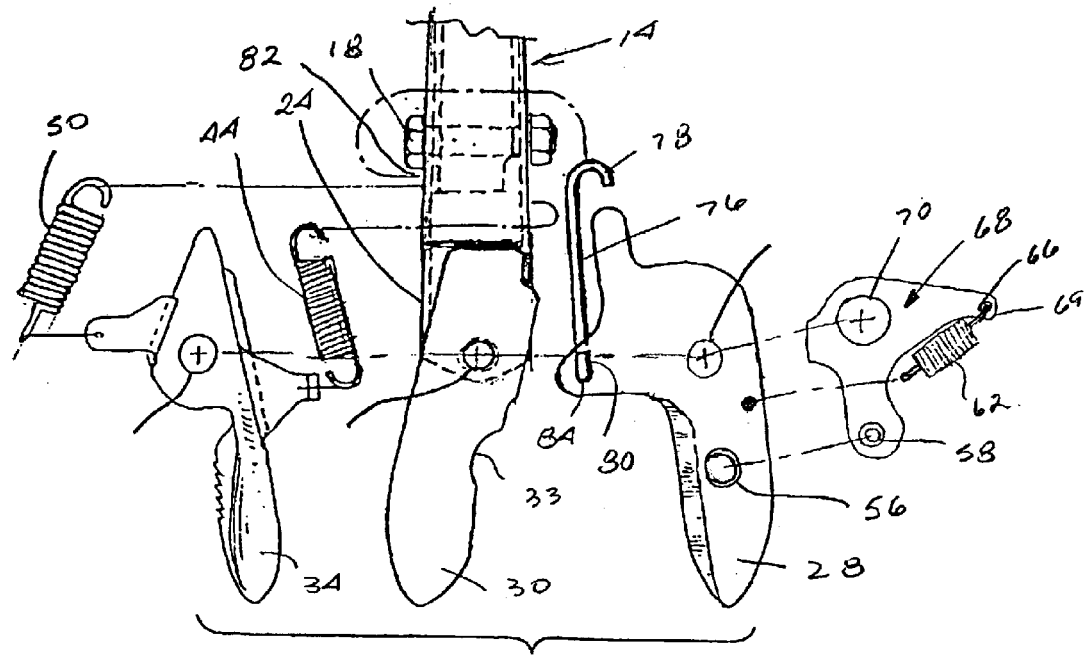
FIG. 2 is an exploded plan view of the cutting blades, clamping mechanism, and dispenser arm of the present invention.
FIG. 3 is a plan view showing one of the cutting blades and the clamping mechanism of the present invention, with the upper cutting blade being removed for purposes of illustration, the clamping member being shown engaging and clamping a plant stem in the clipper mechanism.
FIG. 6 shows the upper cutting blade in the process of cutting the stem as the handles are progressively squeezed together, showing the liquid chemical dispenser outlet nozzle pivoted away from the chemical opening in the cutting blade.

A clamping member 34 is pivotally mounted on bolt 32 on the underside of inner end of handle member 24. Clamping member 34 comprises a flat plate 36 with a flange 38 extending at a right angle therefrom along an edge of the plate adjacent indentation 33 in the lower blade, so that flange 38 is positioned opposite the edge of indentation 33 and can therefore serve to clamp a plant stem between the clamping member and the lower blade. A bearing 40 is positioned in an opening 42 in the clamping member 34 to permit the clamping member to easily pivot about the shaft of bolt 32, which desirably is a shoulder bolt that acts as a pivot pin. The operation of the clamp is shown in FIG. 3.

All of the blades and clamping member are biased in an open position. A spring 44 extending between an opening in tab 46 on the clamping member 34 and an opening 48 in a leg of actuating member 26 is continuously in tension and urges clamp 34 to be pivoted to an open position. Another, stronger tension spring 50 extends between an opening in a flange 52 on a side of the clamp opposite to tab 46 and extends to an opening 54 at the lower end of actuating member 26. This spring is under no tension when the clippers are open and the hand grips are uncompressed. When, however, the hand grips are squeezed together, the greater force of spring 50 overcomes the force of spring 44 and pivots the clamp inwardly to engage the side of a plant stem and pinch it between flange 38 of the clamp and indentation 33 of the lower blade. Whenever the hand grips are compressed, the clamp holds the portion of the stem below where the cut is to be made in a fixed position in the clippers.

Upper blade 28 is mounted on shoulder bolt 32 by an opening 54 in the blade. A liquid opening 56 in the blade is positioned to be aligned with a dispenser outlet nozzle 58, which is mounted to a dispenser arm 68. Liquid opening 56 is positioned so as to be above a stem 60 that is clamped between flange 38 and indentation 33 after the stem has been cut (see FIG. 7). Upper blade 28 is biased in an open position by spring 62, which is connected between an opening 64 in an outer side of the upper blade and opening 66 in a leg 69 of dispenser arm 68, which is positioned on top of upper cutting blade 28. Dispenser arm 68 is pivotally mounted on bolt 32 by means of an opening 70 in the dispenser arm. The tension of spring 62 urges upper blade 28 to its open position.

An actuator link 76 having hooks 78 and 80 at opposite ends extends between opening 82 in actuating member 26 and opening 84 on an inner side of upper blade 28. When the hand grips of handle assembly 14 are squeezed together, actuating member 26 pivots to the left (FIG. 1 orientation), which causes link 76 to pivot upper blade inwardly to cut the stem of the plant clamped in the clippers.

Figure 7:
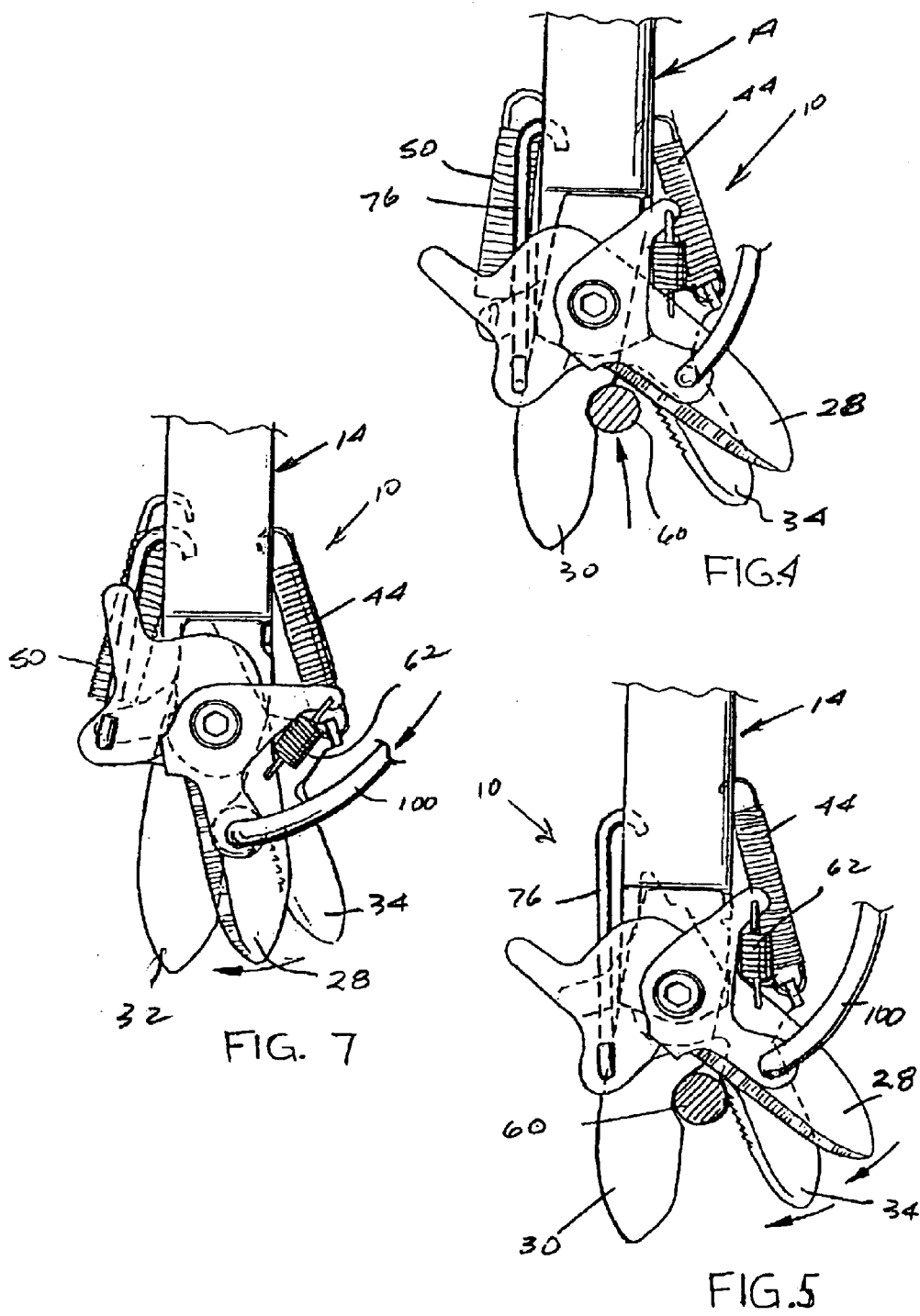
FIG. 7 shows the position of the cutting blades after the stem has been cut and the handle has been closed, with the liquid chemical dispenser outlet nozzle being positioned directly over the cut stem that remains clamped in position below the cutting blade.
Figure 8:
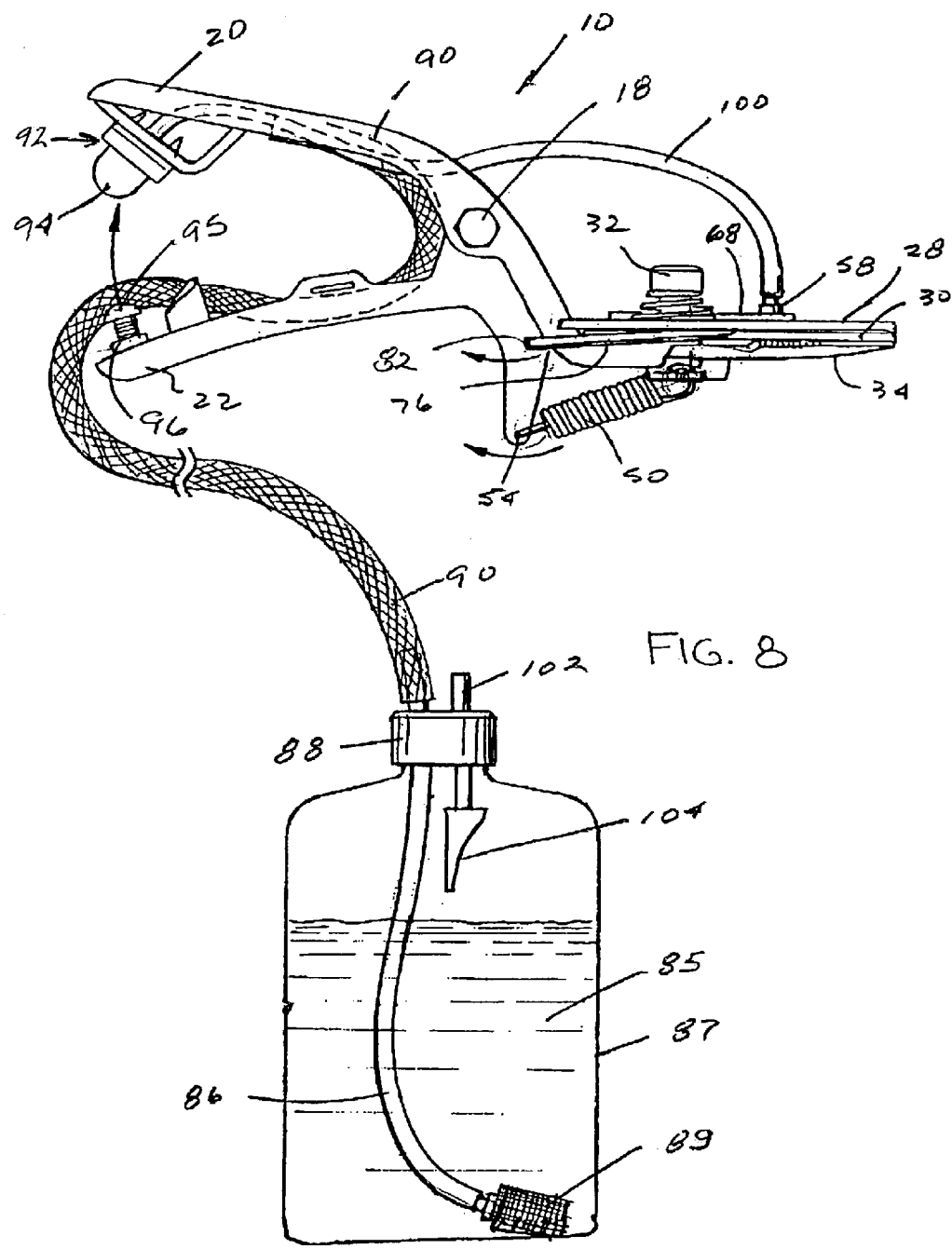
FIG. 8 is a side elevational view showing the clipper and the herbicide container of the present invention.
Figure 9:
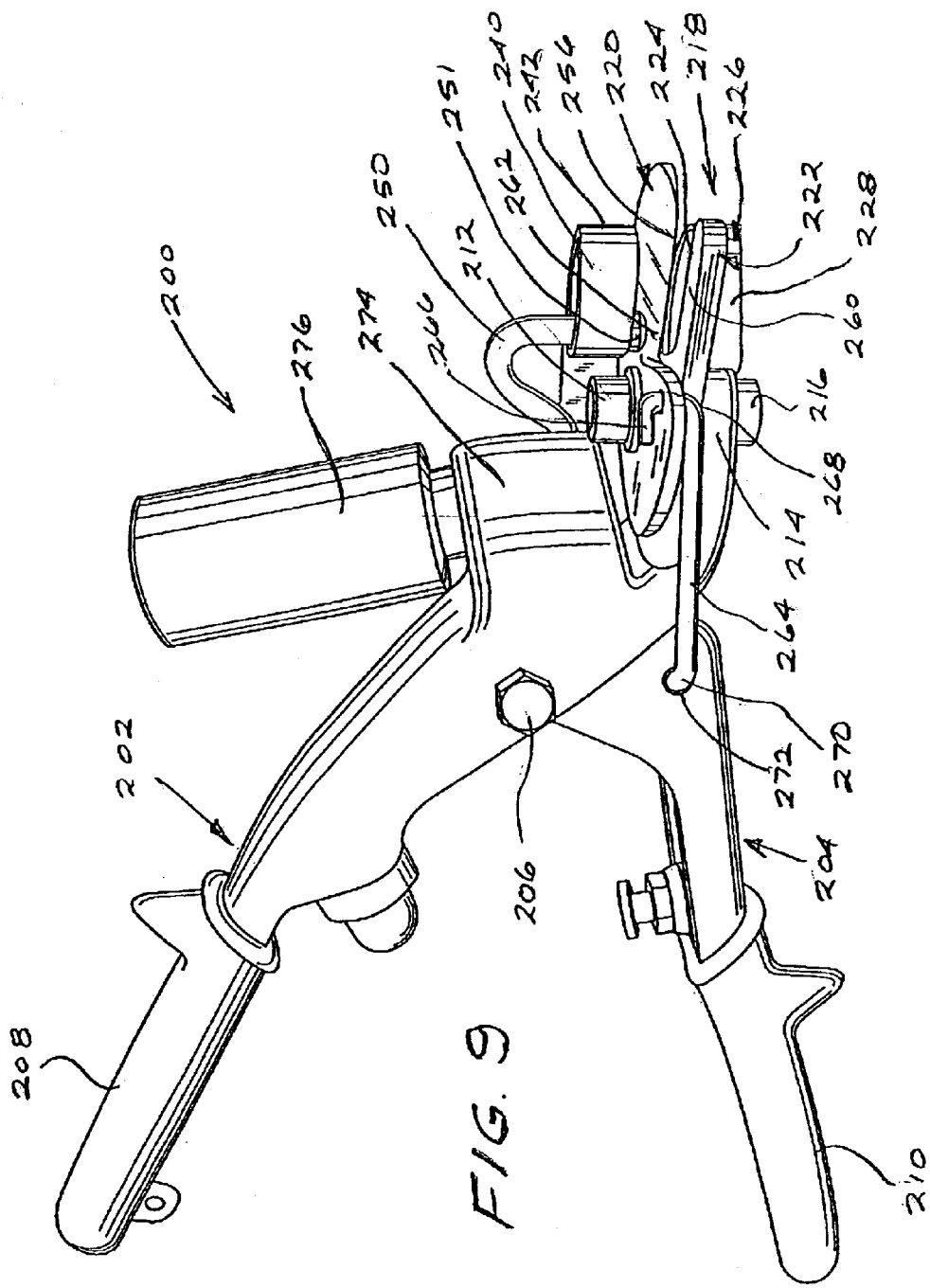
FIG. 9 is a front perspective view of a second embodiment of the present invention.
Figure 10:
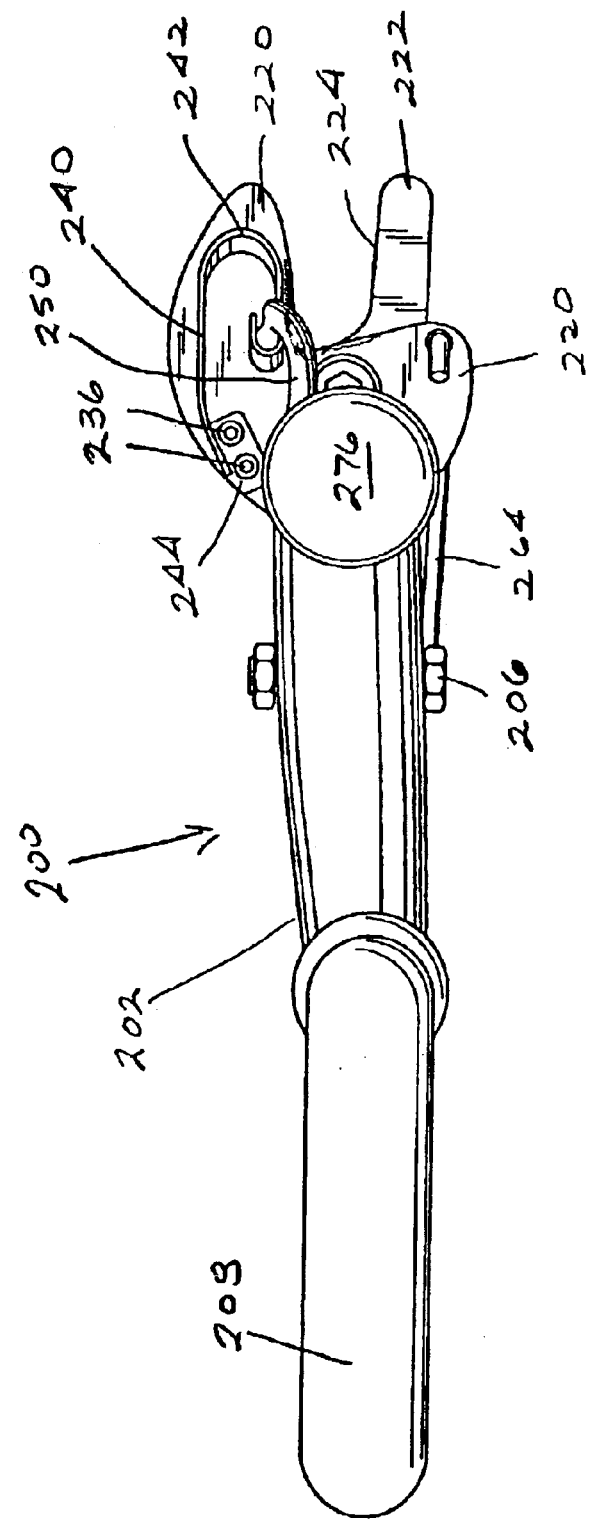
FIG. 10 is a plan view thereof.
Figure 16:
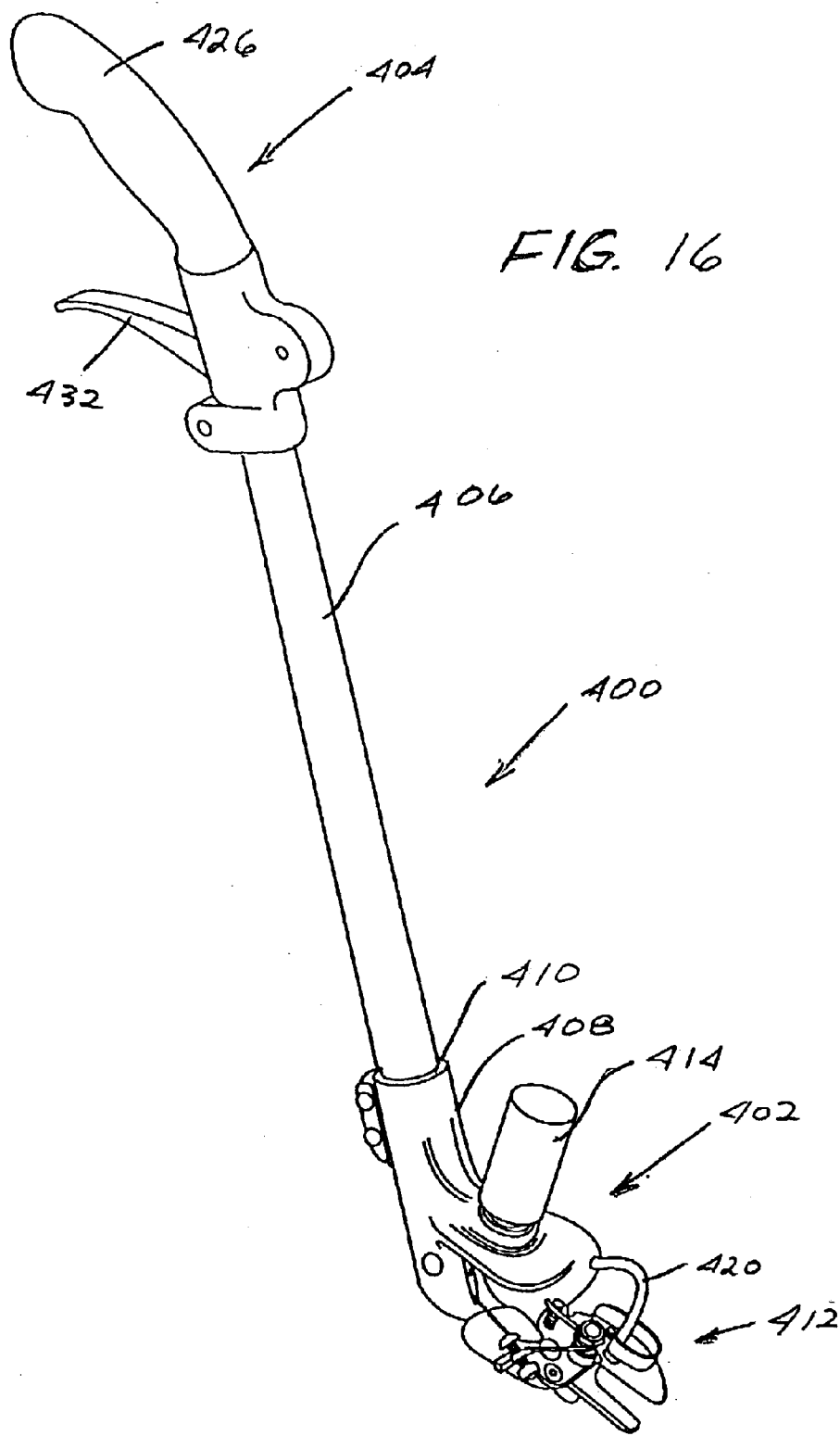
FIG. 16 is a perspective view of a third embodiment of the present invention employing an elongated handle.
Figure 17:
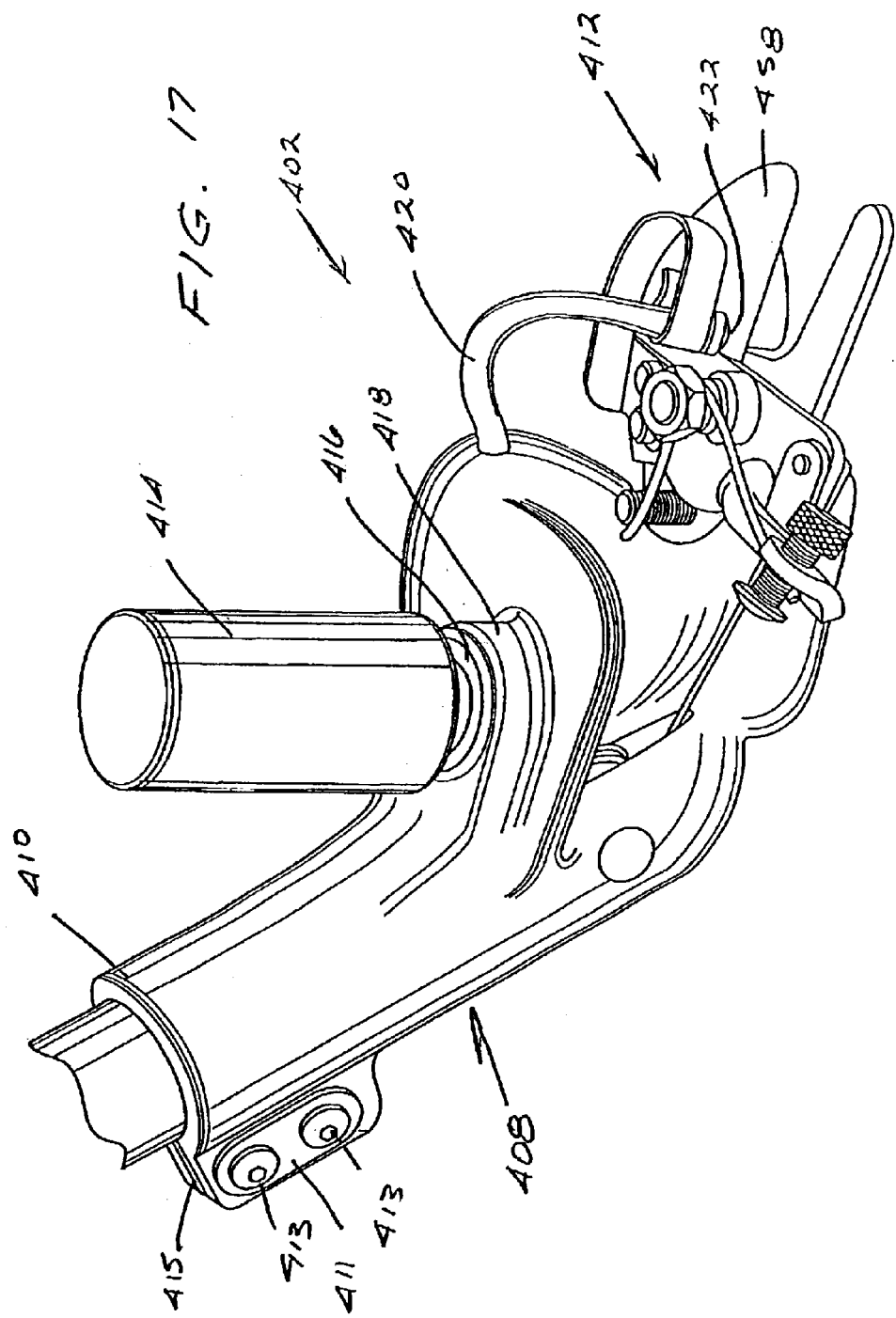
FIG. 17 is a fragmentary perspective view showing the clipper assembly of FIG. 16.
Figure 18:
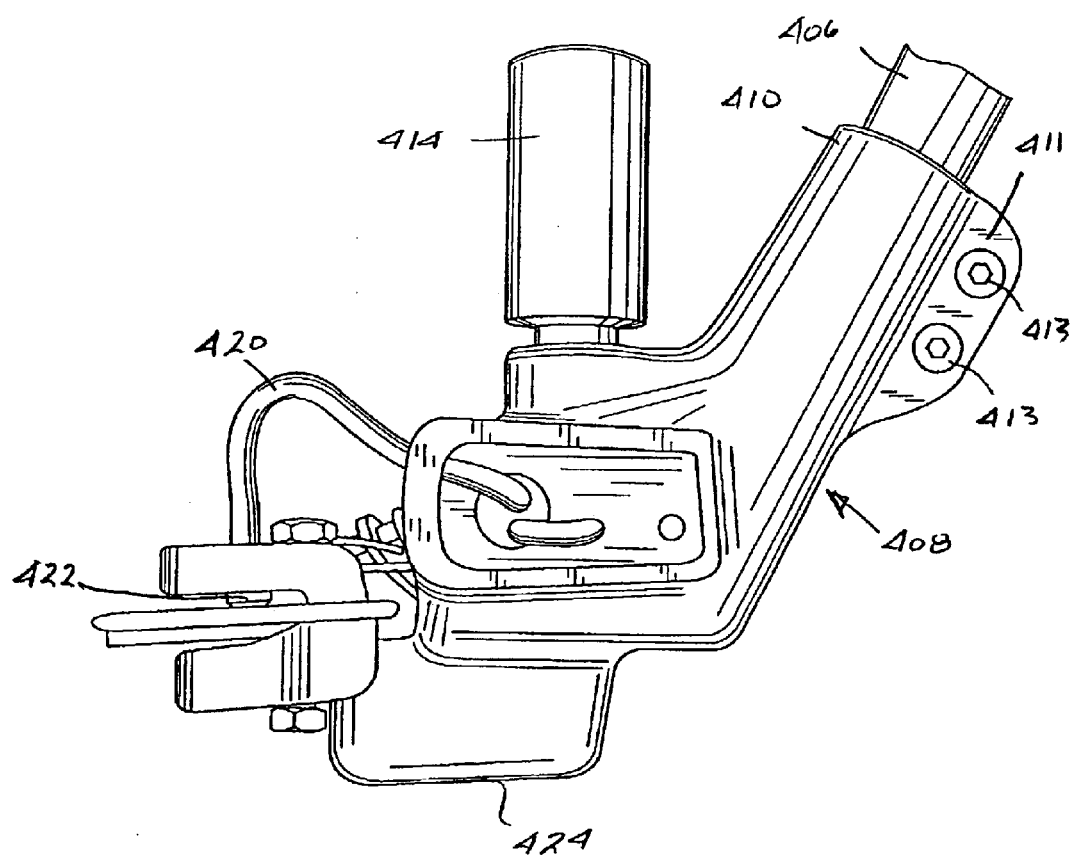
FIG. 18 is a side elevational view of the clipper assembly of FIG. 16, shown from the left side.

The operation of the cutting mechanism is illustrated in FIGS. 4–7. In FIG. 4, the stem has been inserted into the clipper but the clipper handle has not yet been closed. In FIG. 5, the handle has been closed partly so that the tension of spring 50 overcomes the tension on spring 44 and causes the clamp to hold the plant stem between lower blade 30 and clamp 34 (see FIG. 3). As the hand grips are further squeezed together, link 76 pivots upper blade 28 into contact with stem 60 and causes the stem to be cut, as shown in FIG. 6. As the stem is being cut, dispenser arm 68 engages the upper portion of the stem and is pivoted to the right by the upper stem until the cut is complete and the upper stem falls away. When the handles are completely closed together, the upper blade has cut the stem, the dispenser arm is spring biased to re-center the delivery tube and nozzle over opening 56 after a cut stem falls away. At that point, as shown in FIG. 7, outlet nozzle 58 of the herbicide dispenser is positioned in line with liquid opening 56 in the blade and immediately above the position where stem 60 is clamped between the clamp and lower blade.

The structure and operation of the chemical dispenser 12 of FIGS. 1–8 are as follows. Herbicide or other chemical 85 in container 87 enters a weighted inlet opening 89 in inlet tube 86. The inlet opening can have a screen type filter over the inlet. The inlet tube extends through a cap 88 threaded on the top of container 87 and then connects to a tube or conduit 90 which extends from the herbicide container to the clipper mechanism 10. Conduit 90 leads to a bulb-type pump 92 positioned between the hand grips. In the illustrated embodiment, the pump is positioned at an outer end of the upper hand grip 20. A hollow bulb 94 on the lower side of pump 92 engages an adjustable actuator 95 attached to lower hand grip 22. Actuator 95 is threaded in a nut 96 and is vertically adjustable thereby. Pump 92 is a conventional bulb-type pump wherein a one way valve connected to an inlet restricts liquid flow into the bulb and a one way valve connected to an outlet leading to outlet conduit 100 restrains liquid flow to one way out of the bulb. Thus, when the bulb is depressed, any liquid in the bulb is exhausted through outlet conduit 100 and when the bulb is thereafter released and expands to its full size, liquid is drawn into the bulb through inlet conduit 90. When actuator 95 depresses bulb 94, it injects a small amount of chemical through outlet nozzle 58 and then automatically refills itself when the handle grip is opened.

Adjustment of actuator 95 can be made in order to insure that the bulb is depressed just the right amount to dispense the desired amount of chemical whenever the hand grips are squeezed together.

The cap in the container 87 includes an inlet conduit 102 connected at an inner end to a one-way valve 104 that admits air only into the container to balance internal pressure and prevents air from flowing out of the container through tube 102. One-way valve 104 conveniently is a leaf type of valve, sometimes called a duck bill valve, which is conventional.

One of the important features of one aspect of the present invention is that when a plant is sheared with the clipper of the present invention, the stem of the plant is held securely by the clamp until a discreet amount of chemical is dispensed in the open cut in the stem. The amount of chemical is small and therefore does not affect other plants in the vicinity. Nonetheless, the chemical is dispensed by being squirted directly in a directed jet right into the open cut in the plant and is conveyed readily to the roots of the plant. The chemical, if a herbicide, then kills the plant at it roots and prevents the plant from further propagation. The herbicide or other chemical is also transmitted to other roots in an interconnected root system, so a herbicide will kill other plants in the chain, even though those plants may not have been sheared by the clipper. The plant clipper of the present invention operates simply and effectively in holding a plant stem in place, cutting the plant and dispensing a discreet amount of herbicide or other chemical on the cut plant stem. This eliminates the need to repeatedly cut the same plant and it also prevents further propagation of a tuberous type of plant.

A second embodiment 200 of the present invention is shown in FIGS. 9–15. Clipper 200 comprises a pair of upper and lower handles 202 and 204 pivotally mounted together by a horizontal pivot pin 206 for movement between open and closed or deactuated and actuated positions in a vertical plane. The references to horizontal and vertical positions or planes is intended to refer to the normal orientation of the clippers for most clipping operations, but these terms are intended to be relative for convenience of description. It is understood that the clippers may be operated in other positions, such as to clip a horizontally extending branch or stem.

Handles 202 and 204 have hand grips 208 and 210 at outer ends of the handles. The inner ends 214 and 215 of the handles constitute actuating members for actuating the shears and chemical dispenser. A shoulder bolt or pivot pin 212 extends vertically through an inner end 214 of upper handle member 202. A nut 216 threads on the bottom of bolt 212.

The cutting blade and stationary clamping member are mounted on pivot pin 212. These include a lower clamping assembly 218, a cutting blade 220, positioned immediately above the clamping assembly, and a dispenser arm 222 mounted on the cutting blade.

Clamping assembly 218 functions in a manner similar to the lower blade and clamping member of the previous embodiment. Clamping assembly 218 includes a fixed positioned lower blade 222 having a wide blunt edge 224 positioned opposite to a deflectable clamping member 226. The deflectable clamping member 226 is in the form of a generally U-shaped leaf spring 228 having the bite end facing forwardly and having an outer end 230 of an outer leg 232 of the spring attached to a rear portion of blade 220 by means of a right angle mounting flange 234 on the leg, with a pair of attachment screws 236 extending through the flange and screwing into blade 220. The inner leg 238 of the clamping spring may have an outwardly curved end 239 (all as shown in FIGS. 11–14) in order to retain the stem in position.

A dispenser arm 240 is mounted on the top surface of blade 220. Dispenser arm 240 is a U-shaped leaf spring having its bite facing forwardly and having an outer end of outer leg 242 attached by a right angle mounting flange 244 to the upper surface of blade 220 by screws 236. These screws may hold both the clamping spring and the dispenser arm to blade 220 and may have nuts that screw on the lower ends of the screws.

An inner leg 246 of the dispenser arm is formed in the shape of a loop 248 having an open side that fits over an end of chemical dispenser tube 250 and resiliently urges the end of the dispenser tube to be maintained at the dispensing location shown in FIG. 12. The tube may be fitted with a nozzle to direct liquid in a directed stream from the outlet end of the dispenser tube.

Lower blade 222 is mounted in a non-rotatable position on the inner end 214 of handle 202. A screw 252 (FIG. 11) attaches an outer end of lower blade 222 to the inner end 214 of handle 202 and prevents the lower blade from rotating around the axis of bolt 212.

Blade 220 has a flat bottom surface 254 and a beveled inner edge 256 that leads downwardly and inwardly from an upper surface 258 to bottom surface 254. The sharp inner edge 256 is thus positioned immediately adjacent the upper surface 260 of the lower blade and forms a cutting edge therebetween.

Edge 256 of blade 220 can be straight or can be recessed somewhat at an inner end 262 so as to urge plant stems toward the inner end of the blades.

Blade 220 is pivotally rotated around bolt 212 by an actuator arm 264 having a hook 266 at an outer end that fits through an opening 268 in blade 220. A hook 270 at an inner end of the actuator arm fits through an opening 272 in lower handle 204. Thus, when lower handle 204 is moved form its deactuated position (shown in FIG. 8) to an actuated position wherein the handles are squeezed together, actuator arm 240 causes blade 220 to rotate toward fixed lower blade 222.

A front portion of handle 202 positioned above the blades constitutes a manifold 274 for a chemical container 276. The chemical container has a threaded lower end 278 that fits in a threaded opening 280 in the manifold (FIG. 11). The container can be a conventional plastic container and preferably is a container having a liquid capacity of several ounces of liquid. A one way air inlet valve 282 is mounted on the end of a tube 284 extending inwardly into the interior of container 276 and desirably is a conventional leaf valve as described above (see FIG. 12). This permits air to enter the container but not flow out of the container. A liquid outlet tube 286 extends from the lower end of container 276 to an inlet of pump 288. Pump 288 is the same type of bulb pump described above and has a hollow, resilient bulb 290 that forms a collapsible liquid chamber. The pump has an outlet 292 leading through a conduit 294 to an outlet opening in an outlet nozzle 296 that is positioned opposite an opening 298 in upper blade 220. A one way inlet valve and a one way outlet valve are positioned at the inlet and outlet of the pump respectively. Thus, when bulb 290 is collapsed, liquid contained in the bulb is discharged through outlet 292 and ultimately through nozzle 296. The liquid is then directed through opening 298 to the space immediately below the cutting blade. Pump 290 generates enough pressure on the fluid that the fluid squirts through opening 298. The liquid, however, is directed in a narrow stream directly at the cut stem of the plant from a short distance away and thus is received substantially entirely on the end of the plant stem.

The amount of liquid dispensed from the pump each time the clipper handles are moved from their deactuated to their actuated positions is controlled by an adjustable actuator 300 which is mounted on the upper side of lower handle 204 immediately opposite bulb 290. Actuator 300 has a head 302 attached to a threaded shaft 304 which threads into a threaded receptacle 306 in lower handle 204. A lock nut 308 locks the threaded shaft at any desired axial extension. By extending the shaft outwardly or inwardly, the amount of compression of the bulb that occurs when the handles of the clipper are squeezed together changes the amount of liquid dispensed with each actuation of the clipper handles.

The clipper of the present invention operates in a manner shown in FIGS. 1–15. In FIG. 13, blade 220 is partially closed on stem 350 and has cut partially through the stem. Leg 238 of clamping member 232 engages the stem and resiliently clamps the stem against flat surface 224 of fixed lower blade 222. This clamping member engages the portion of the stem below the cutting edge of the blade.

At the same time, the leaf spring of dispenser arm 240 engages the portion of the stem above the cutting edge of the blade.

As the blades continue to close, as shown next in FIG. 14, the lower portion of the stem causes clamping member spring 232 to deflect further, continuing to provide a secure clamping force between the lower portion of the stem and the fixed lower blade 222. The attached upper portion of the stem deflects leg 246 of the dispenser arm inwardly, thus displacing the outlet of dispenser tube 296 away from opening 298.

When the cutting blade has cut all the way through the stem, as shown in FIG. 15, the upper portion of the stem 352, having been severed from the lower portion of the stem, then falls away, permitting the dispenser arm to return outlet nozzle 296 to its original position, wherein it is aligned with opening 298 in blade 220. Desirably, opening 298 is elongated, with the upper side of opening 298 being beveled and the outer surface of the nozzle being beveled, so that the nozzle fits in the opening when in its aligned position but is cammed upwardly and out of the opening by the beveled surfaces when the dispenser arm is urged away from the opening. Thus, the outlet nozzle can be displaced from the opening easily but tends to nest in the opening when urged back to its original position.

When the stem is cut completely through, the lower portion of the stem remains clamped between clamp 232 and lower blade 222. By the time that the nozzle returns to its mating position with opening 298, actuator button 300 has come in contact with bulb 290 of the pump and causes the pump to inject an appropriate quantity of liquid directly on the end of the lower portion of the stem, which is now in alignment with opening 298. The clipper handles are then returned to their deactuated or open positions, and this releases the lower portion of the stem from the clamping mechanism.

It should be noted that the upper and lower blade members are formed so that as the blade begins to close on the stem, as shown in FIG. 14, the outer tips of the blades are closer together than the inner portions of the blades, thus urging the stem toward the inner end of the blade, where the stem will be in alignment with opening 298 after it is cut. The urging of the stem toward the inner end of the blades can be accomplished by the relative angular positions of the blades or by an indented portion of the blade that urges the stem to be held at a given position, as shown in the prior embodiment, for example.

The advantage of this second embodiment of the invention is that it is not necessary to carry an extra container of chemical apart from the clippers themselves. A small quantity of chemical in a small container provides an ample supply of chemical for a rather long period of time of gardening, and the container is easily removable and refillable to add more chemical. This provides a simpler operation and requires less conduit or tubing than the prior embodiment. The shorter clipper blades, which are also preferably heavier than the blades of the prior embodiment, improve leverage and cutting ability for larger, woody stems.

Still another embodiment of the present invention is shown in FIGS. 16–25. In this embodiment, clipper 400 has a clipper head 402 that is functionally similar to clipper 200, but the operating handle mechanism 404 is separated from the clipper mechanism by a tubular handle 406, thus permitting the user to operate this clipper from a standing position.

Clipper head 402 includes a molded or otherwise formed housing 408 having a tubular collar 410 at an upper end thereof in which the tubular handle 406 fits. The housing is fitted with a blade mechanism 412 as described above in connection with the second embodiment.

The housing also has a relatively wide, flat foot 424 that extends downwardly from the bottom of the housing. The clipper rests on the foot in operation. The foot spaces the blade mechanism above the ground when the clipper heads rest on the ground. This prevents the blade assembly from being jammed into the ground and fouled by sand and soil during clipper operation. An annular outlet of a chemical container 414 is mounted in a threaded opening 416 in a manifold 418 having an outlet connected to an outlet conduit 420 that leads to outlet nozzle 422 substantially as described previously.

Figure 25:
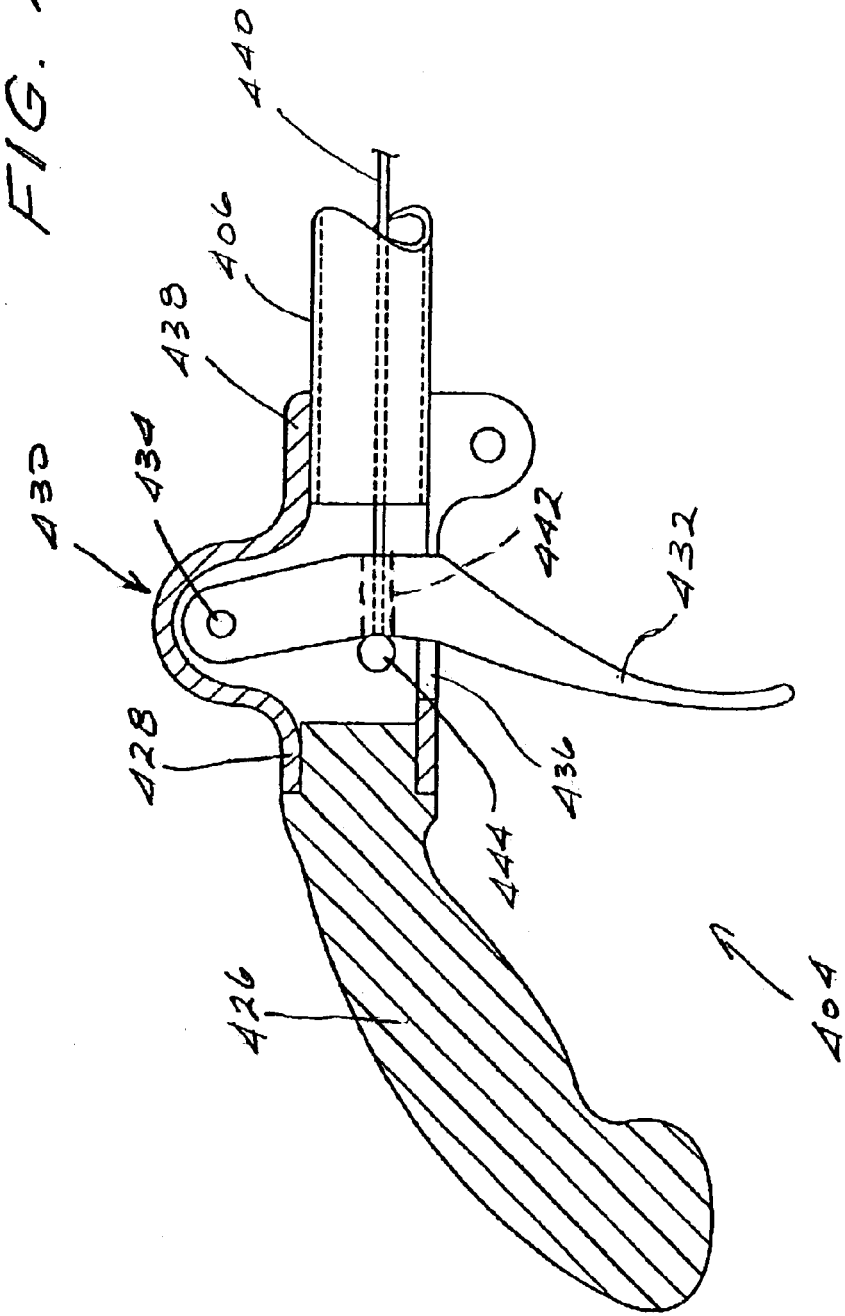
FIG. 25 is a sectional side elevational view of the handle assembly of FIG. 16.

This embodiment is actuated by handle 404, shown in detail in FIG. 25. Handle 404 includes a fixed position hand grip 426 covered with a suitable hand grip material. The hand grip fits in a tubular end 428 of a housing 430. An actuating lever 432 is pivotally mounted on a pin 434 in the interior of housing 430. The actuating lever extends through an opening 436 in a lower portion of the housing. The tubular handle 406 is mounted in a tubular opening 438 in the housing. An actuating cable 440 extends through the tubular handle 406. The cable can extend through an opening 442 in the actuating lever to an enlarged end 444 which does not fit through opening 442 and thus holds the cable in place. The end of cable 440 can also be attached to the actuating lever in any number of other ways known to those skilled in the art. The attachment causes the cable to be axially drawn away from the clipper when the trigger is pulled by an operator.

As shown in section in FIG. 24, cable 406 extends into a cavity 450 in housing 408. The cable then passes over a pulley 452 rotatably mounted on a pin 454, and then the cable traverses horizontally to a U-shaped clip 456 which is pinned to the side of moving blade 458 (which is substantially the same as blade 220). A head 460 is formed on the end of the cable to lock the cable in clip 456.

Another feature of this embodiment of the invention is shown in FIG. 24. With the use of a cable to actuate the clipper, it is necessary to provide a tension adjustment in the cable for initial installation and for when the cable stretches with later use. A simple adjustment mechanism comprises beveling the lower end 407 of tube 406, preferably with a spiral bevel. The lower end abuts a projection 409 into the interior of the tube socket. As the tube is turned, the bevel urges the tubular handle further out of the collar 410 in housing 408, thus tightening the cable. The cable can be loosened by turning the handle in an opposite direction. The collar has an open longitudinal slot 415 in the side wall, with locking flanges 411 being positioned on opposite sides of the slot. Locking bolts or screws 413 extend through openings in the flanges. These bolts can be loosened to permit handle rotation for cable adjustment purposes, and then tightened to lock the handle at any selected rotational adjustment position. The clipper assembly also includes a lower blade 462, a lower clamping member 464, and a resiliently movable dispenser arm 466, substantially as described above in connection with the second embodiment.

The manner in which this embodiment is actuated is somewhat different from the hand clipper embodiment described above. In this embodiment, a pump 468 having a resiliently collapsible bulb 470 is mounted on the side of the clipper housing in line with an actuator member 472 mounted on an upstanding flange 474 at the rear edge of moving cutting blade 458. The actuator has a head 476 attached to a threaded shaft 478 which threads into the flange 474. A lock nut 480 holds the shaft at any desired axial location. Actuation of the clipper blades from their deactuated position, shown in FIG. 21 to their actuated position in FIG. 22 causes the actuator element 472 to pivot into contact with bulb 470 and resiliently collapse the bulb. The pump receives liquid from container 484 through an outlet conduit 486 that leads to the inlet of pump 460. The outlet of pump 460 is connected through an outlet conduit 420 to outlet nozzle 490, which is positioned adjacent an opening 492 in the cutting blade 458. A one way inlet valve 494 admits air into container 484 as liquid is dispensed through the pump.

In the prior embodiment, the handles are urged toward their open or deactuated positions by a coil spring mounted on pin 206. In the present embodiment, a coil spring 496 is mounted on bolt or pivot pin 498 on which the blades are mounted. Outwardly extending arms 500 and 502 bear against the bracket 474 and the housing in order to urge the blades into a normally open position.

The clippers of this embodiment operate substantially the same as the clippers of the previous embodiment in order to cut the stem of a plant, while holding the lower portion of the stem and then injecting chemical on the cut end of the lower portion of the stem before the handles are opened or deactuated and the lower stem released.

A fourth embodiment 500 of the clipper and dispenser mechanism of the present invention is shown in FIGS. 26–29. Clipper and chemical dispenser 500 comprises a conventional hand clipper 502 comprising a pair of hand grips 504 and 506 pivotally connected by a pivot pin 508, with shear type cutting blades 510 and 512 mounted on the ends of handles 506 and 504 respectively. In this embodiment, the handles and blades move in the same plane. Blade 510 is a blunt blade, called a counter blade, while blade 512 is a thinner blade having a sharp edge and is referred to as the cutting blade. The handles are biased outwardly by a spring 514. Liquid chemical 515 is provided in a container 516. The container has a cap 518 having an air inlet 520 through a duck bill valve 522. Liquid passes through an outlet 524 from an interior tube 526 having a weighted end 528 that rests in the bottom of the container.

Outlet tube 530 extends to an end 532 of handle 504 and thereafter continues inside the handle or on the inner side of the handle to fitting 534 which connects to a tube 536 leading to a nozzle 538 positioned over an opening 540 in blade 512. A spring 542 has an end 544 that engages nozzle 538 and holds it in place. Spring 512 is attached by fasteners 546 to an outer side of blade 512. A pump 548 of the type described above with respect to previous embodiments is mounted on an inner side of one of the handles 504 and is positioned opposite an adjustable actuator 550 which is screwed into the handle by screw 552. Rotation of the actuator and screw 552 varies the axial position of the actuator toward and away from the bulb of pump 548.

Figure 27:
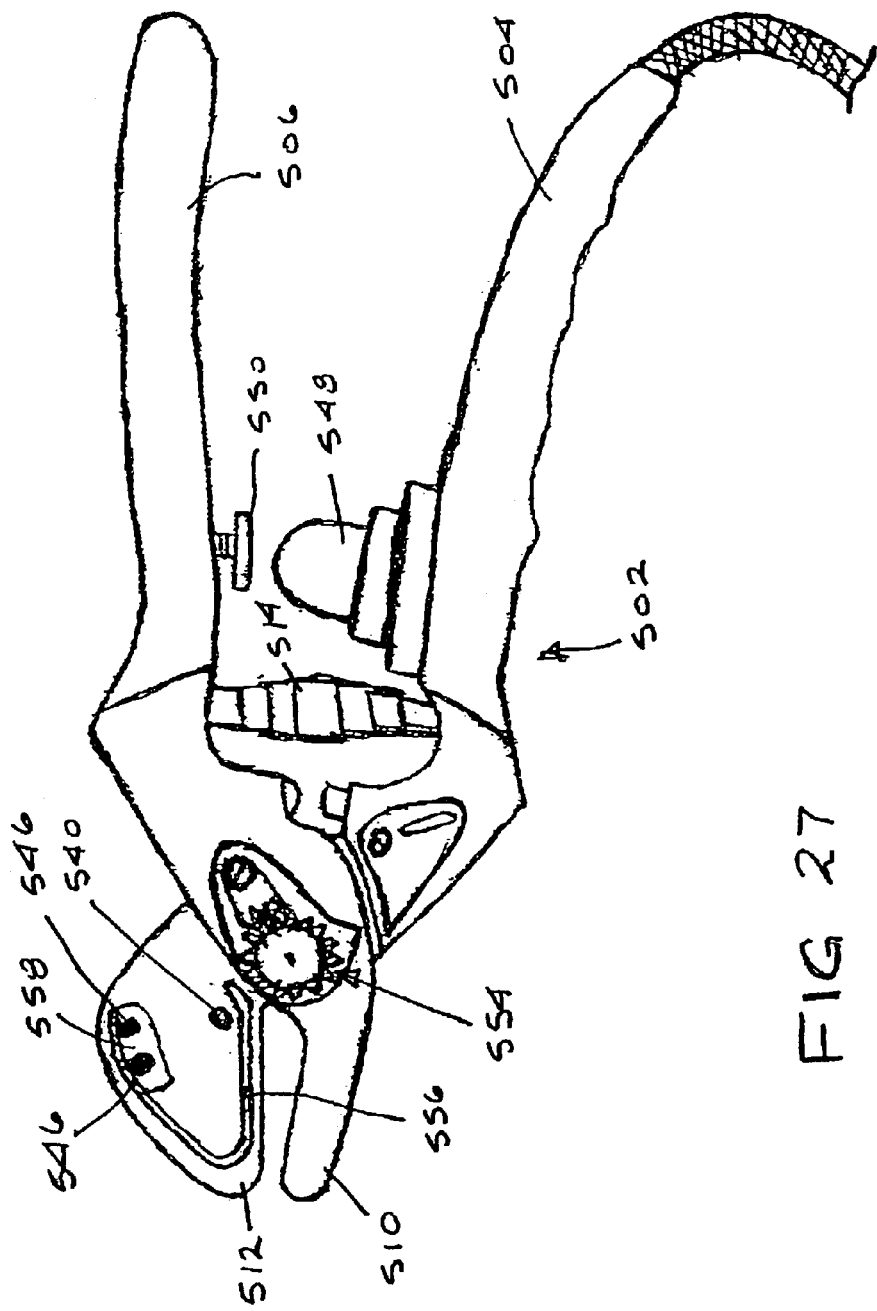
FIG. 27 is a plan view of the clippers of FIG. 26 taken from the opposite side of the clippers.

The opposite side of clippers 502 is shown in FIG. 27. As shown, the two jaws of the clippers are drivingly connected by a gear mechanism 554, which is conventional for at least certain well-known brand names of clippers.

Figure 26:
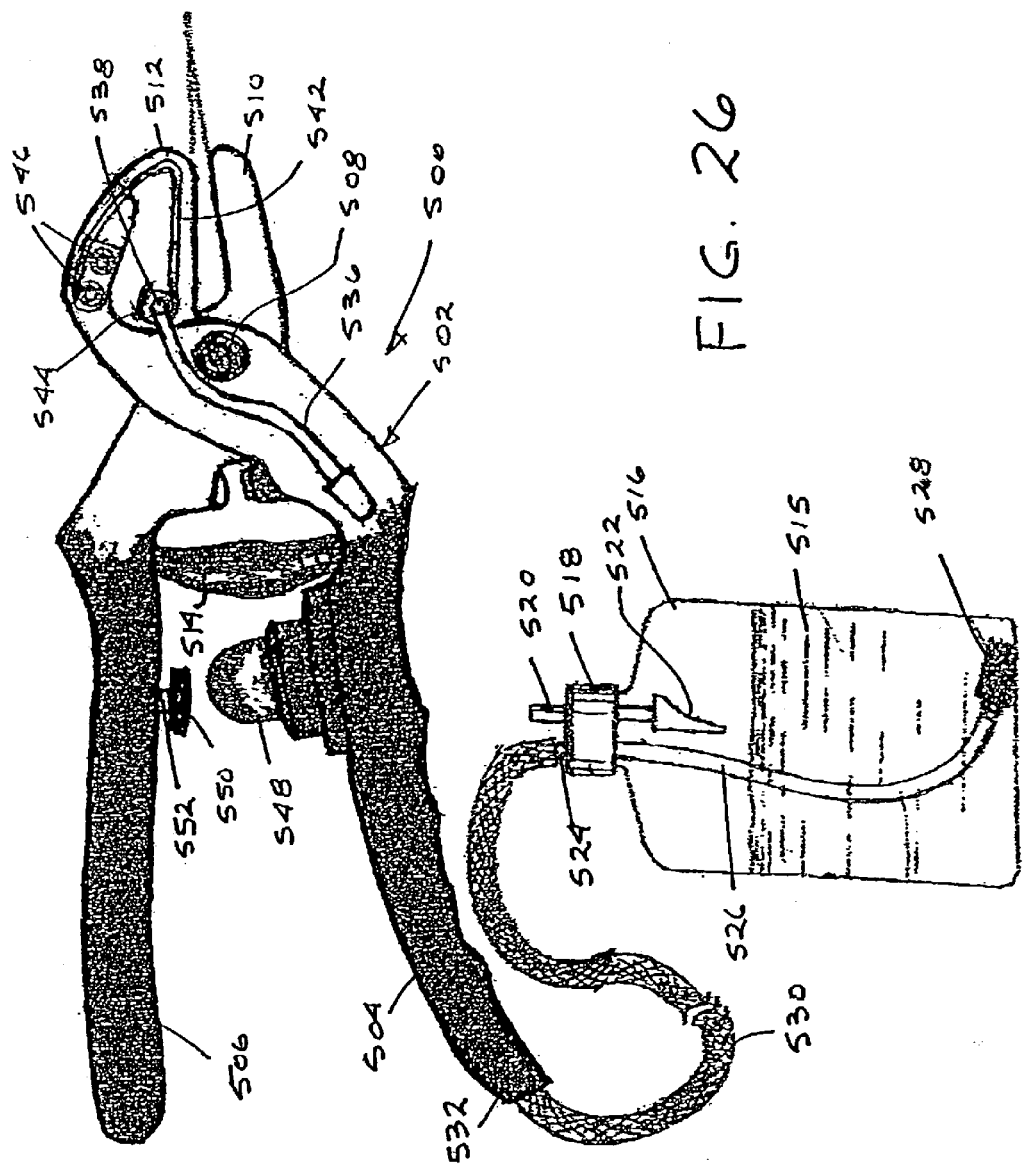
FIG. 26 is a plan view of a fourth embodiment of the present invention wherein the clippers are of a conventional hand clipper design.

The inner side of the blade, shown in FIG. 27 includes another spring mechanism 556, mounted by a bracket 558 by the same fasteners 546 as attached to the spring on the other side of the blade. Opening 540 is shown in FIG. 27. It should be noted that the clipper blades are formed so that the outer ends of the blades are closer to each other than the inner ends of the blades. This causes the blade surfaces to slope outwardly as they extend from the outer ends to the inner ends of the blades. This urges a branch or stem inwardly toward the pivot axis of the blades as the blades close on the stem. Thus, the stem is urged toward the pivot axis and toward the chemical dispensing mechanism of the clippers. The angular disposition of the blades is shown in FIGS. 26 and 27.

Figure 28:
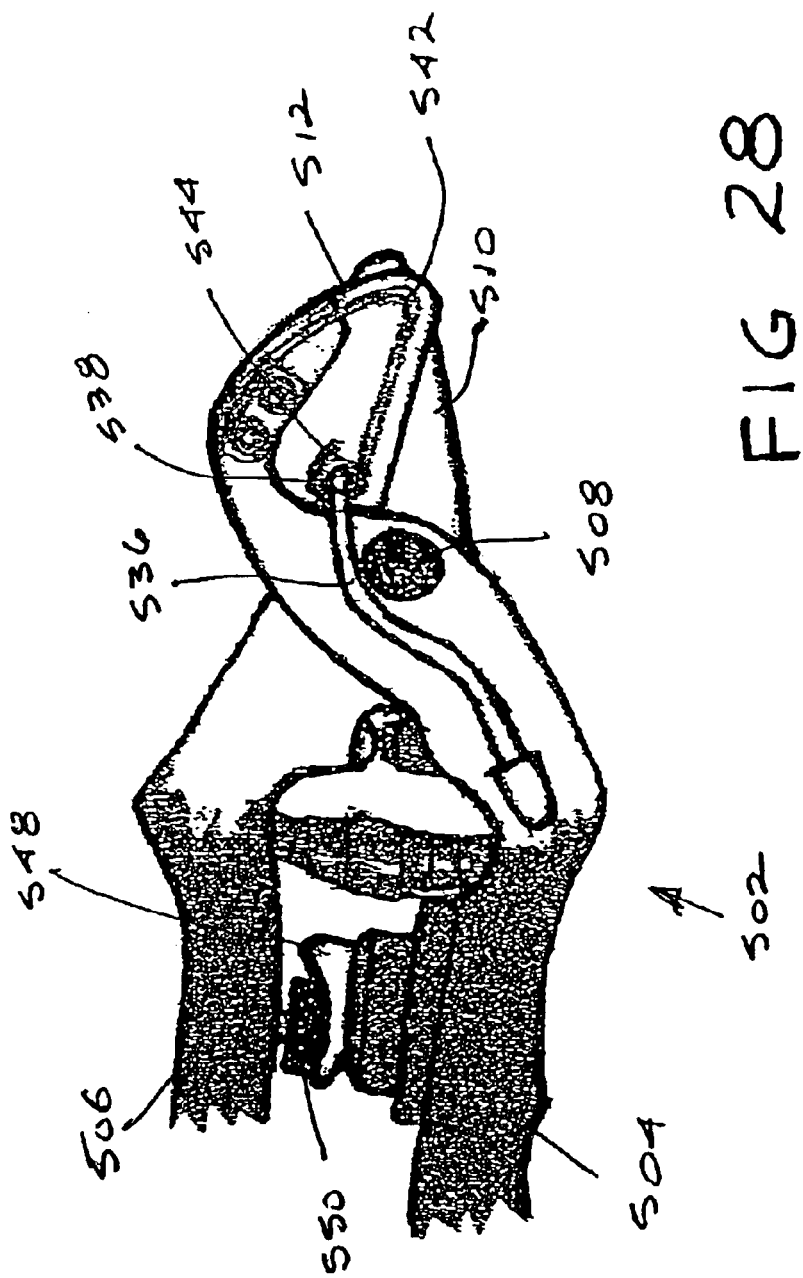
FIG. 28 is a plan view of the clippers of FIG. 26 showing the clippers in a closed position.
Figure 29:
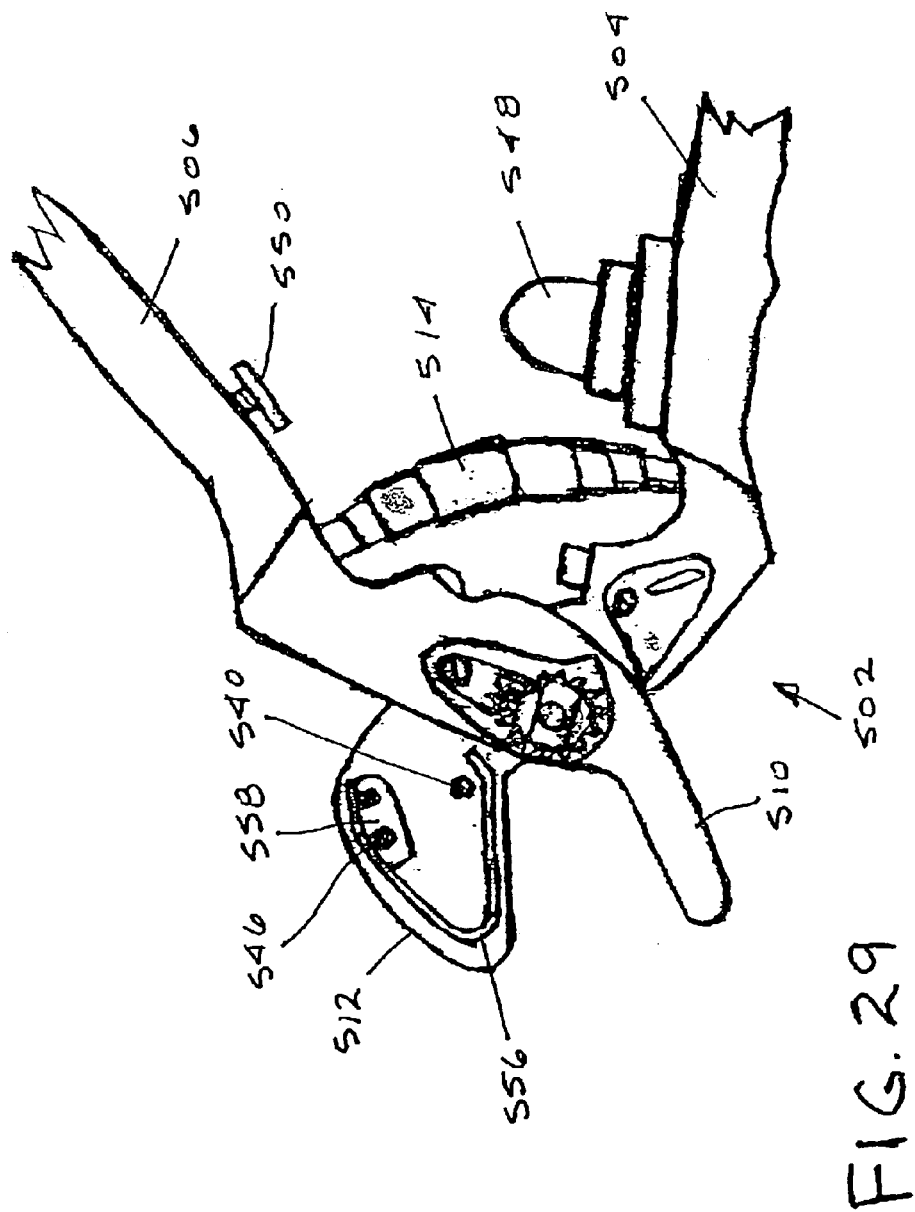
FIG. 29 is a plan view of the clippers of FIG. 27, showing the clippers in an open position.

In FIG. 28, the blades are shown in a completely closed position, with the actuator having compressed the bulb on the pump. At this point, liquid is squirted in a direct jet through opening 540 onto the freshly cut stem of the plant.

A fifth embodiment of a clipper and chemical dispenser mechanism 600 is shown in FIGS. 30–34. Clipper and dispenser mechanism 600 includes a shear mechanism in the form of a pair of loppers 602 having a pair of elongated handles 604 and 606 connected at one end by a pivot pin 608, with a pair of bypass shear blades 610 and 612 being connected at the ends of handles 604 and 606 respectively. An inner edge 614 of blade 612, which is a counter blade, is curved so as to urge a cut branch into a position opposite an opening 616 in blade 610. A pair of rubber bumpers 618 and 620 are positioned at inner ends of the handles 604 and 606 respectively to cushion and stop the inward movement of handles 604 and 606. A U-shaped leaf spring 622 is mounted by a bracket 624 by means of fasteners 626 on the inner surface of blade 610.

Liquid treatment chemical 627 is provided to the clipper mechanism from a container 628 having an open top covered by a lid 630. The lid has an outlet conduit 632 leading to a quick connect fitting 634 to tube 636 that leads to the inlet 638 of a bulb pump 640 of the type described above. Outlet 642 of bulb pump 640 leads through a conduit 644 to a nozzle fitting 646 attached to the outer side of blade 610 (see FIG. 34). Tube 644 is held in place by a sleeve 648, which is fastened to the outer surface of the blade by means of a bracket 650 held in place by screws 652. Bracket 650 also has a U-shaped leaf spring 654 mounted thereto, with an outer end 656 of the spring having a loop thereon that engages nozzle 646. Nozzle 646 rides in a recessed groove 658 in the blade that extends between an inner end 660 and hole 616 through the blade.

As shown in FIG. 31, lid 630 has an outlet 632 clamped in place by a nut 633. The lid has a one way air inlet valve in the form of a conventional umbrella valve 635. Umbrella valve 635 has a round flexible membrane disc 637 connected to the lid by stem 639. The membrane covers four outlet openings 641. The number of openings in the particular construction of the outlet valve are known and may be varied to suit a particular application. An umbrella valve of the type described above, however, serves an important function, because the umbrella valve opens to admit air into the container at a low pressure differential and thus minimizes any back pressure on the liquid that would restrain liquid flow through the pump. As in prior embodiments, an interior tube 651 in container 628 leads to a weighted end 653 that remains submerged beneath the liquid chemical 626.

Figure 33:
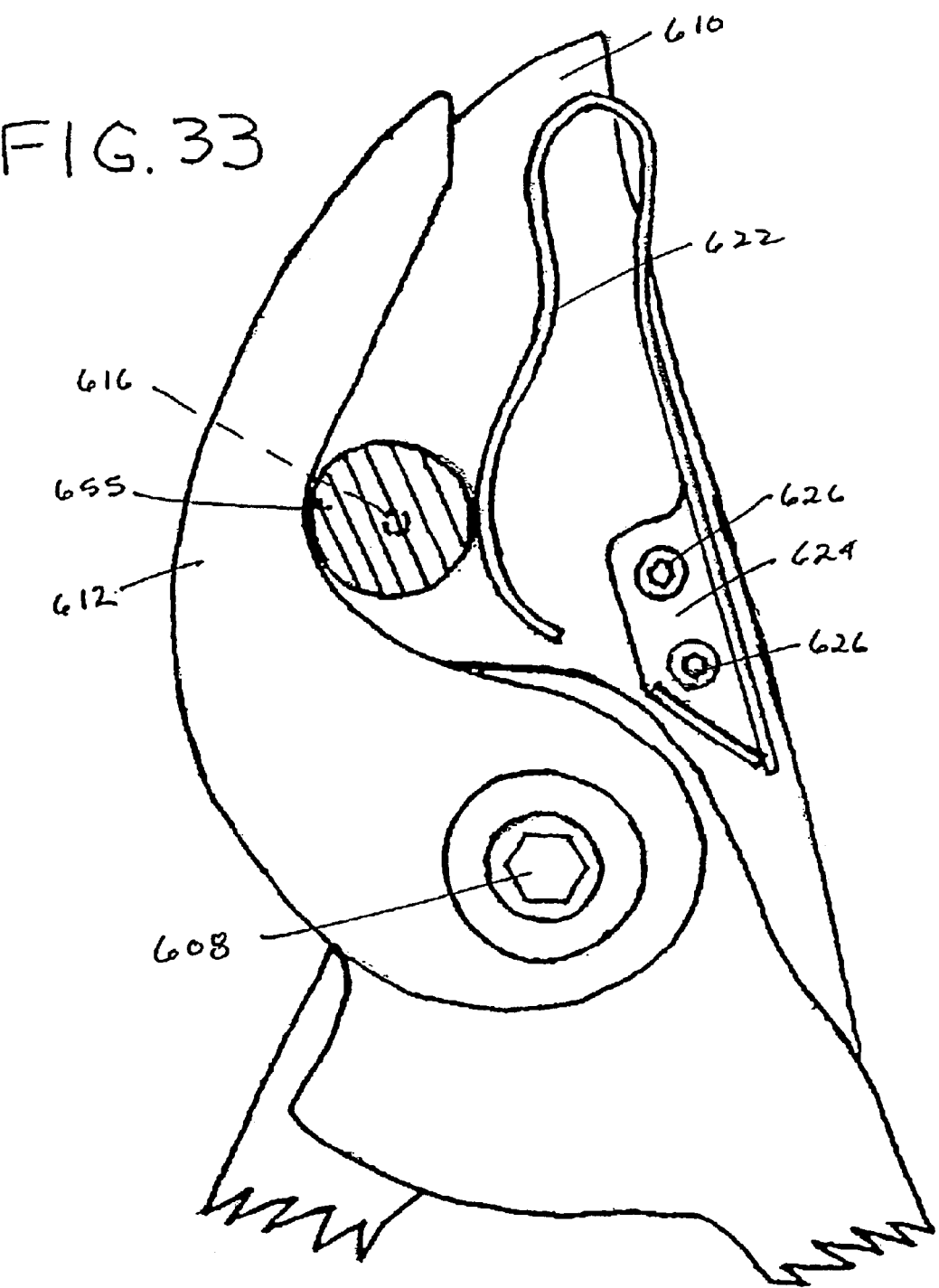
FIG. 33 is a fragmentary view of the clipper portion of the loppers of FIG. 30, showing the clippers in a closed position.

The manner in which a limb is cut by loppers 602 is shown in FIG. 33. There a stem 655 is shown being cut by the bypass shears of the lopper. Spring 622 holds stem 655 in place against counter blade 612 so that after the stem has been cut, liquid chemical can be directed through opening 616 directly against the cut end of the stem. The direct jet that is squirted against the end of the stem is more effectively delivered than a wiping action against a wetted blade or a misting or general spraying action from a spray fitting adjacent the blade.

Figure 34:
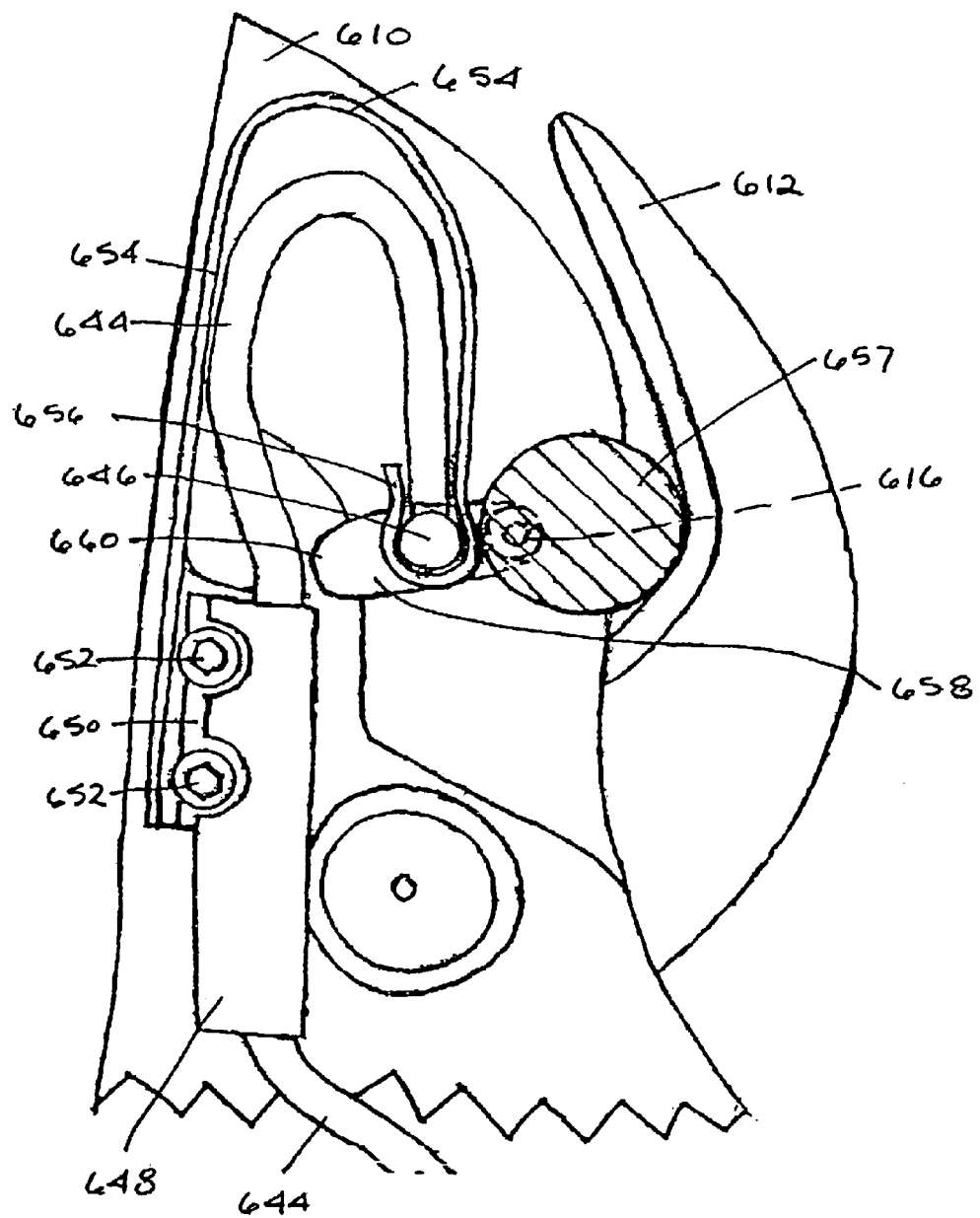
FIG. 34 is a plan view of the clippers of FIG. 33 shown from the opposite side of the clipper blade.

As shown in FIG. 34, the portion of stem 655 that is cut away from the plant is labeled as stem 657. As stem 657 is being cut, the stem compresses U-shaped leaf spring 654 and moves nozzle 646 out of the way so that the stem can be cut. When the stem is completely cut, the nozzle snaps back in place and the pump is actuated to inject liquid chemical through opening 616 onto the cut stem remaining on the plant. This embodiment of the invention functions similarly to the embodiments described above.

Figure 32:
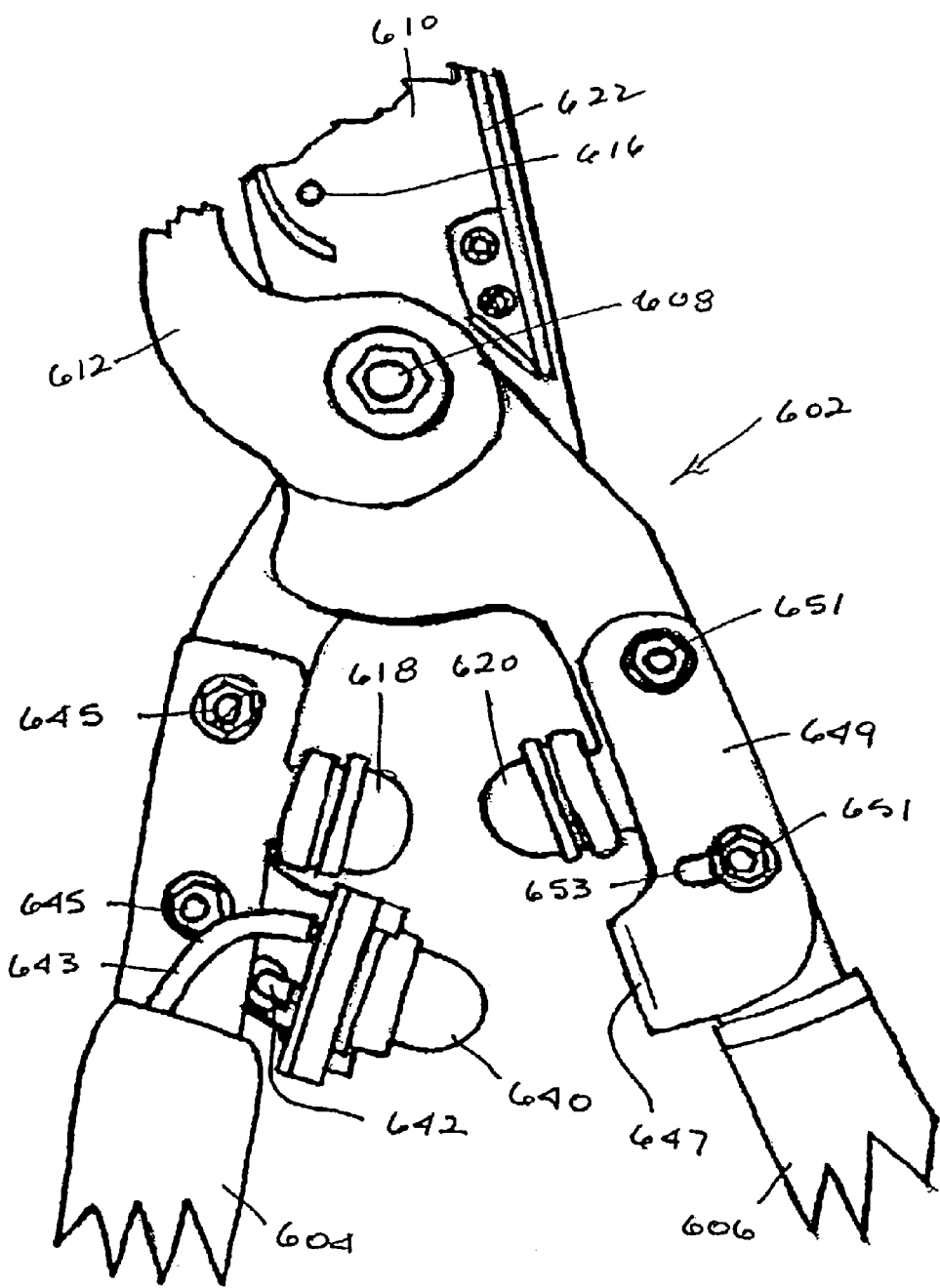
FIG. 32 is a fragmentary plan view showing the pump and rubber bumper portions of the clipper mechanism.

Referring to FIG. 32, pump 640 is mounted on plate 643, which is attached to the clipper handle by fastener 645. The pump actuator surface 647 is mounted on a bracket 649 that is attached to the handle of the clipper by fasteners 651. One of the fasteners extends through a slotted opening 653 which permits inward and outward adjustment of actuator surface 647 in order to precisely set the point at which the pump is actuated.

In the preferred practice of the invention, the pump is actuated while bumper members 618 and 620 are in contact with each other and are being compressed. The compression of the bumper members establishes the stroke of the pump in the pumping action and permits the pump to be actuated a number of times simply by compressing and releasing the handles and permitting the resilient spring action of bumpers 618 and 620 to permit the pump to open and close. Slot 653 makes it possible to adjust pump actuation so it occurs at just the right position in the closing cycle of the clippers.

Figure 35:
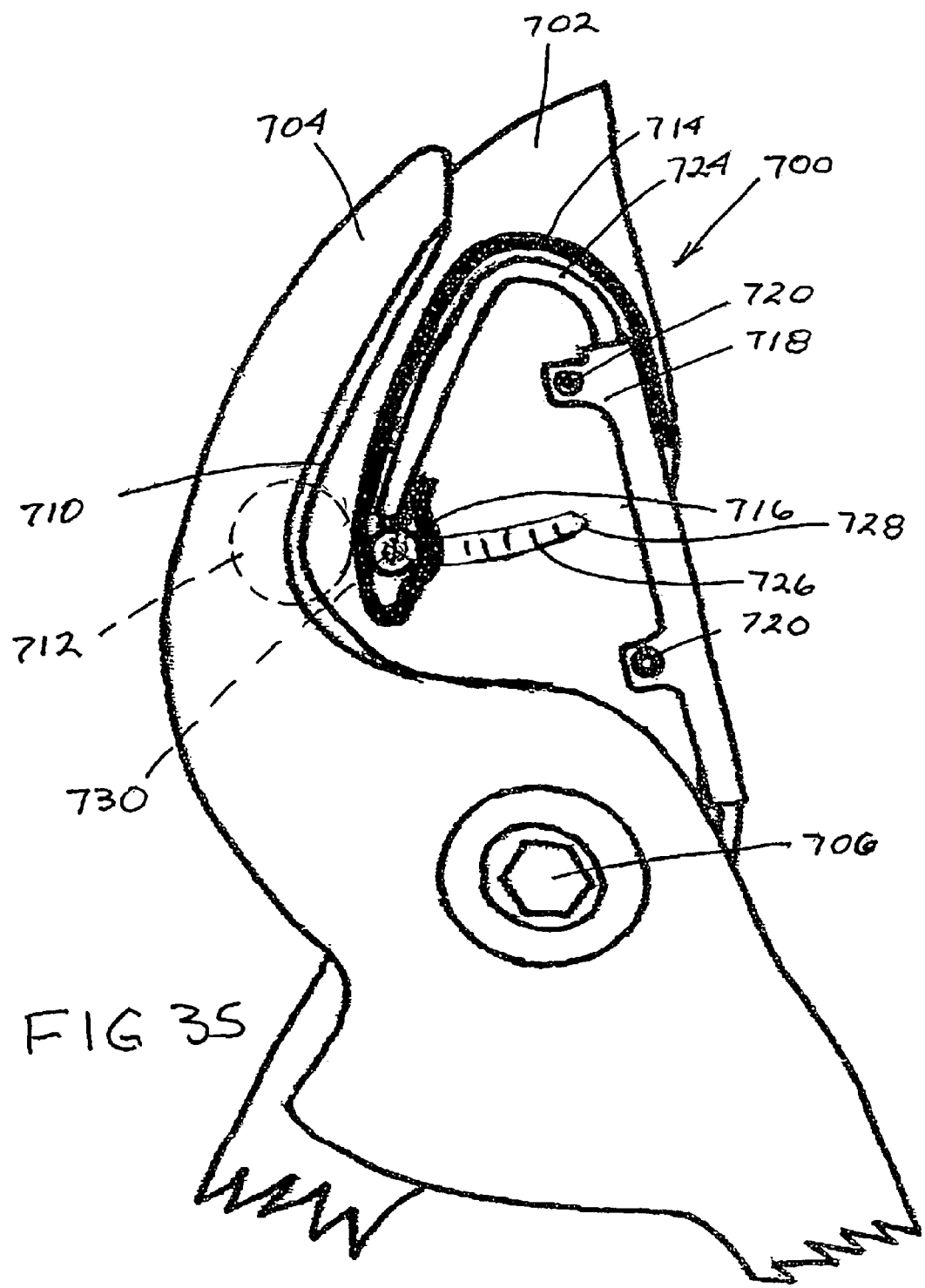
FIG. 35 is a plan view of the clipper head of a sixth embodiment of the present invention, wherein the chemical dispensing mechanism is mounted on an inner side of the clipper blade.
Figure 37:
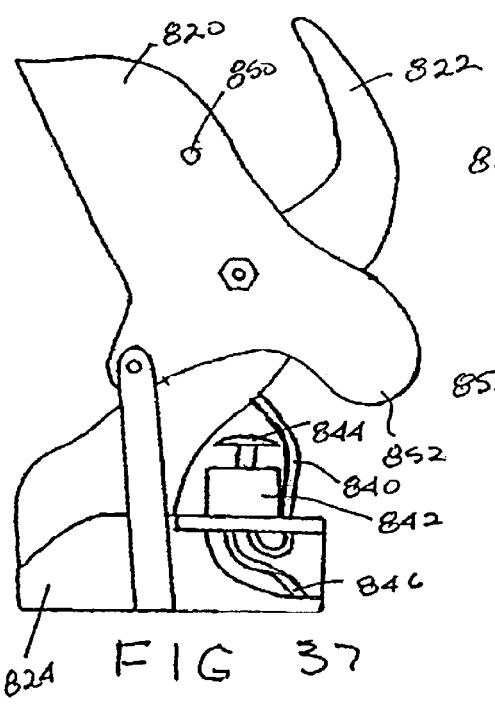
FIG. 37 is a fragmentary view of one side of the clipper element of the clipper mechanism of FIG. 36.

A somewhat different configuration of a clipper or lopper head 700 is shown in a sixth embodiment in FIG. 35. This head could be employed with either a lopper or clipper mechanism. In some circumstances, it is desirable to place the cutting edge of the clipper blade flush against the main stem of a plant and have the portion of the plant being cut off being positioned adjacent the counter blade of the clipper mechanism. In such an embodiment, the chemical delivery tubes can no longer be delivered to an outer portion of the cutting blade but must instead be delivered to an inner portion of the blade so that they can be directed outwardly from the outer side of the blade to contact the cut stem adjacent thereto. This type of cutting, wherein the cutting blade is positioned adjacent the remaining plant is a particular type of cutting practice used in trimming grapevines in the vineyards in France. In trimming grapevines, it is desirable to spray a fungicide and bactericide on the cut plant stem after the stem is cut. The embodiment shown in FIG. 35 accomplishes this purpose.

As shown in FIG. 35, clipper head 700 includes cutting blade 702 and counter blade 704. The blades are connected by a pivot pin 706. Counter blade 704 is similar to counter blade 612 of the previous embodiment, with the exception that an inner edge 710 of the counter blade is beveled so that edge 710 fits under stem 712 as it is being cut and cams the stem away from the counter blade. Thus, when the stem is completely cut, it falls away and is not trapped between the counter blade and spring 714 which holds nozzle 716. U-shaped leaf spring 714 is fastened to the blade by a bracket 718, which is held in place by fasteners 720. Bracket 718 includes a sleeve that holds tube 724 in place as the tube extends outwardly to nozzle 716. A groove 726 is formed in an arcuate position on the inside surface of blade 702 and extends between an end 728 and opening 730 in the blade. The groove permits the nozzle to slide between the ends of the groove as a limb is cut.

As in the previous embodiments, when a limb is cut, spring 714 is first compressed by the limb as it is being cut, and then when the limb cut is completed, the limb is beveled or cammed out of engagement with the counter blade and falls away so that nozzle 716 is snapped back into firing position by spring 714. At that point, a pump of the type described in previous embodiments is actuated by compression of the clipper handles and ejects a quantity of liquid out of the nozzle and through opening 730 in the blade directly onto the cut end of the stem. In this embodiment, the outer side of the blade does not include a clamp to hold the cut stem while liquid is being directed on the end of the stem. Instead, the pumping action is designed to be initiated immediately after the stem is cut so that the clippers are still in position against the stem.

A seventh embodiment 800 of the present invention comprises a flush cut clipper mechanism that includes a power clipper and a power pump for chemical dispensation. Clipper 802 includes a housing 804, a trigger mechanism 806, and a trigger guard 808. Power can be provided by an electrical cord 810 from an external power source or from a battery. A power drive mechanism 814, which can be pneumatic, electrical, or hydraulic, is mounted in housing 804 and drives a reciprocating output shaft 816 by cam, piston, or other suitable drive mechanism. An outer end 818 of shaft 816 is connected with a thin cutting blade 820. Blade 820 is pivotally mounted to a counter blade 822 that is mounted in a fixed position on the end 824 of the clipper. A pivot pin 826 interconnects the cutting blade and counter blade.

The invention illustrated is a so-called flush-cut clipper of the type shown and described above in connection with FIG. 35, wherein the cutting blade is positioned adjacent the portion of the plant that is to remain after a limb has been cut and liquid chemical is dispensed from the inner side to the outer side of the cutting blade. In this embodiment, a U-shaped leaf spring 830 attached to blade 820 by a bracket 832 and fasteners 834 and has a looped outer end 836 that engages a nozzle 838 on the end of delivery tube 840. Chemical delivery tube 840 runs through shutoff valve 842 operated by a plunger 844. Conduit 846 leads from valve 842 to a pressurized reservoir 848 (shown schematically) that can be included in housing 804.

Figure 38:
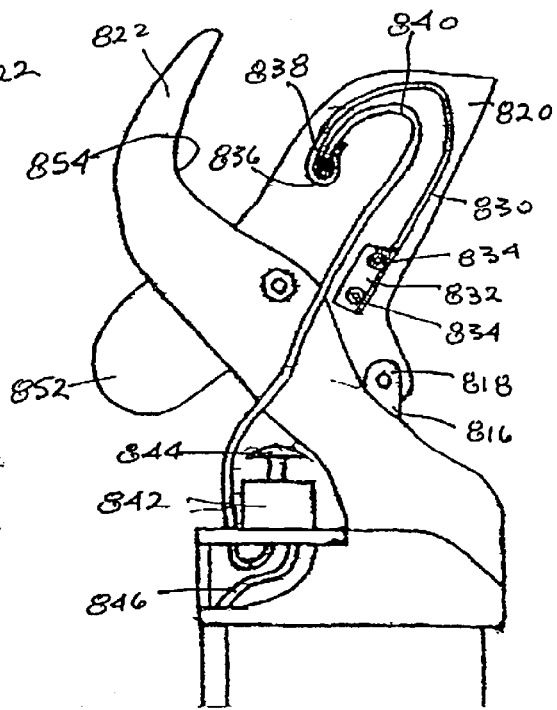
FIG. 38 is a view of the clipper element of FIG. 37 taken from the opposite side of the clipper blade.
Figure 36:
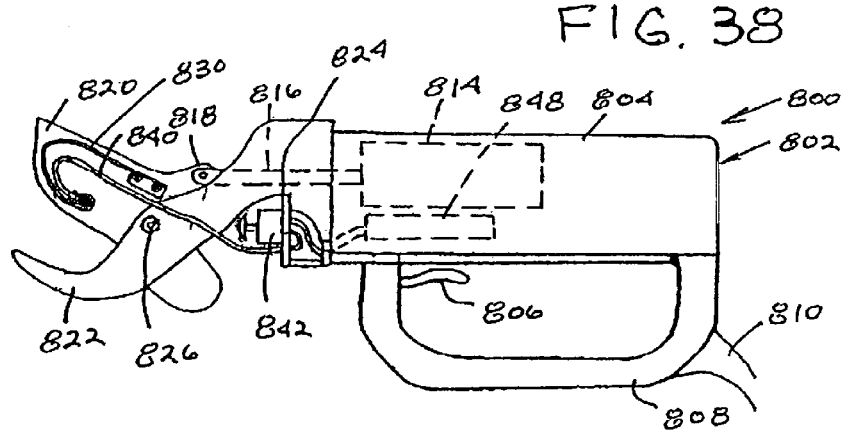
FIG. 36 is a side elevational view of a seventh embodiment of the present invention employing a power operated clipper and chemical pump mechanism.

Nozzle 838 is positioned opposite an opening 850 in blade 820. As described above, when a branch or stem is cut, nozzle 838 is resiliently deflected to the right (FIG. 38 orientation) until the stem is severed. At that time, the stem falls away and the nozzle is resiliently moved back into alignment with opening 850. The cutting blade has a heel 852 on an inner end that acts as a cam and engages valve plunger 844 to actuates valve 842 when the blade is closed. The valve and cam are positioned so that the pump is actuated after the nozzle has had an opportunity to pivot back into alignment with hole 850. As with the prior embodiment, the inner edge 854 of the counter blade can be beveled so that a cut branch slides upwardly and over the outer surface of counter blade 822 as it is cut, thereby facilitating the pivotal movement of nozzle 838 back into alignment with 850 after the branch has been completely cut.

The significance of valve 842 is that it operates in connection with a supply of chemical that is pressurized by the power drive mechanism in a pressurized reservoir inside the housing. The significance of the valve is that when the valve is actuated to permit transmission of liquid through the valve, liquid flows continuously through outlet 838 as long as the blades are closed and the valve remains actuated. In this embodiment, the blade is designed to remain closed as long as the trigger is pulled. Therefore, as long as the trigger is pulled, the blade can be moved around on the end of the stem in order to smear squirted liquid over the end of the stem. This can be desirable to make sure that adequate beneficial chemicals are spread on the end of the stem.

Figure 40:
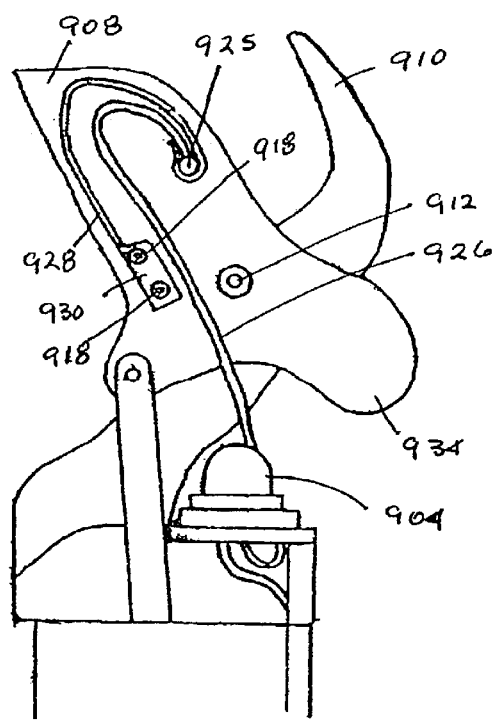
FIG. 40 is a fragmentary view of one side of the clipper blade of the embodiment of FIG. 39.
Figure 41:
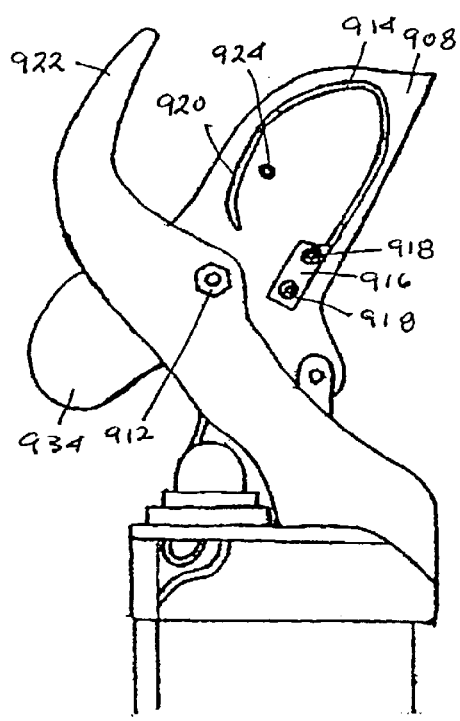
FIG. 41 is a fragmentary view of the other side of the clipper blade of the embodiment of FIG. 39.
Figure 39:
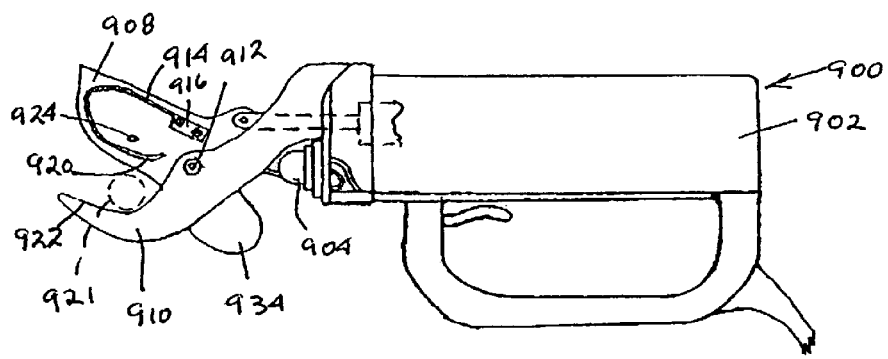
FIG. 39 is a side elevational view of an eighth embodiment of the present invention employing a power operated clipper but a manual bulb type pump for chemical.

An eighth embodiment 900 of the present invention is shown in FIGS. 39–41. This embodiment is similar to the previous embodiment with the exception that a manual pump is used instead of an actuation valve in order to dispense chemicals, and a stem gripping clipping mechanism is employed for dispensing chemicals on an inner side of the clipper blade.

Referring to FIG. 39, a clipper mechanism 902 of the same type employed in the previous embodiment is shown. The principal difference is that a manual bulb pump 904 is used for pumping chemical to the dispenser outlet. Bulb 904 is actuated by heel 906 of cutting blade 908, in the manner described previously. Cutting blade 908 is pivotally mounted to counter blade 910 by a pivot pin 912. A clamping U-shaped leaf spring 914 is mounted on the inner face of the blade 908 by a bracket 916 secured by fasteners 918 to the surface of the blade. An inner end 920 of U-shaped leaf spring 914 engages a stem 921 on an opposite side from a flat edge 922 of counter blade 910 and clamps the stem in place as it is cut.

As the plant stem is held in place over opening 924 in blade 908, liquid chemical is dispensed by pump 904 through nozzle 925 via conduit 926 leading from pump 904 to the nozzle. The nozzle is held in place by means of a U-shaped leaf spring 928 of the type described above, which is attached to the inner surface of the blade by a flange 930 and fasteners 918. As described above, as a stem is cut, nozzle 925 is pivoted by the portion of the stem being cut away to the left (FIG. 40 orientation) until the stem is severed and falls away. The nozzle then pivots back to alignment with hole 924. At that point, heel 934 of blade 908 engages bulb 904, compressing the bulb and pumping a specific quantity of liquid chemical through nozzle 925 and blade opening 924 onto the cut stem of the plant. The chemical, as described above, can be a fungicide or bacterial agent for treating a desired plant being pruned to prevent bacterial or fungal infection through the cut in the plant. Alternatively, the chemical can be an herbicide for killing an unwanted plant all the way down to the roots.

All of the embodiments of the present invention provide a convenient and effective way of cutting the stem, cane, or branch of the plant while at the same time dispensing a herbicide or other chemical on the cut end of the stem without creating the risk of spraying the chemical on other plants and without requiring that the chemical be wiped on the end of the stem by physical contact with an applicator.

It should be understood that the foregoing embodiments are merely representative of the preferred practice of the present invention and that various changes and modifications in the arrangements and details of construction of the invention may be made without departing from the spirit and scope of the present invention.

I claim:

1. A plant clipper with integral chemical dispenser that dispenses treatment chemicals directly on the stem of a plant after it is cut, comprising:

a blade assembly including relatively pivotally attached first and second opposed blades, the first blade having a thin cutting edge adapted to slice through a plant stem, the first blade having a chemical outlet opening therein positioned so as to be opposite the end of a plant stem after it has been cut, the second blade having an edge that faces the cutting edge of the first blade and abuts and engages the plant stem adjacent the cut caused by the first blade;

a pair of handles operably connected to the blade assembly so as to close and open the blades when the handles are moved between closed and open positions; and a chemical dispenser connected to the clipper that is actuated by the movement of the handles to squirt chemical on the cut end of the plant stem from a chemical dispenser outlet through the first blade chemical outlet opening after the plant stem has been cut, the chemical dispenser being positioned to squirt chemical from an outlet on an inner side of the first blade, through the opening in the first blade, and out of an outer side of the first blade, such that a cut stem on the outer side of the first blade receives chemical after the stem has been cut through by the clipper, the chemical dispenser outlet including an outlet nozzle movably mounted adjacent the inner surface of the first blade for movement between a dispensing position, wherein the nozzle is aligned with the opening in the first blade, and a retracted position wherein the nozzle is moved away from the opening in the first blade, the nozzle being resiliently biased toward its dispensing position, such that a stem being cut away deflects the nozzle to its retracted position while it is being cut, and the nozzle returns to its dispensing Position when the stem has been cut and falls away from the plant, the chemical dispenser being actuated by the clipper movement to discharge chemical through the outlet nozzle when the nozzle is in its dispensing position.

2. A plant clipper according to claim 1 and further comprising a clamping member pivotally mounted in the clipper adjacent the blades for pivotal movement in a plane parallel to the blades, the clamping member being positioned opposite the second blade such that when a plant stem is inserted between the blades for cutting, the clamping member is on the opposite side of the stem from the second blade, the clamping member being resiliently biased toward the second blade, the clamping member resiliently clamping the stem of the plant against the second blade alter the stem has been cut, the second blade having a clamping surface opposed to the clamping member, the chemical dispenser being positioned so as to direct liquid chemical from an outer side of the first blade through the blade and toward the end of a stem being clamped by the second blade and clamping member on an inner side of the first blade.

3. A plant clipper according to claim 1 wherein the clipper is a powered clipper wherein a powered drive mechanism for closing the clipper blades is actuated by closing a switch or valve.

4. A plant clipper according to claim 3 wherein the chemical is stored under pressure and is released by a shutoff valve that is opened by the closing of the clipper blades with the handles, the valve remaining open for continuous discharge of chemical through the outlet as long as the blades remain closed, thus permitting release of chemical for an extended period of time.

5. A plant clipper according to claim 1 wherein the plant clipper is a hand clipper wherein the handles and blades move in parallel planes.

6. A plant clipper according to claim 1 wherein the plant clipper is a lopper.

7. A plant clipper according to claim 1 wherein the plant clipper is a powered clipper.

8. A plant clipper with integral liquid chemical dispenser that dispenses chemical directly on a cut end of the plant stem after it has been cut, comprising:

a pair of handles connected together for relative movement between deactuated and actuated positions;

a clamping mechanism operably connected to the handles so as to move between released and clamping positions in response to movement of the handles between their deactuated and actuated positions, the clamping mechanism having opposed gripping surfaces that move together in a plane to grip a plant stem positioned in a predetermined generally perpendicular location between the gripping surfaces when the handles are moved to their actuated positions, the clamping mechanism moving to its released position, wherein the plant stem is released, when the handles are moved back to their deactuated positions;

a cutting mechanism positioned adjacent the clamping mechanism and operatively connected to the handles so as to cut the plant stem off adjacent the place where the stem is gripped by the clamping mechanism when the handles are moved to their actuated positions, the cutting mechanism comprising a cutting blade that moves in a plane parallel to the plane of movement of the gripping surfaces of the clamping mechanism; and a chemical dispenser operatively connected to the handle mechanism and cutting mechanism that dispenses a quantity of liquid chemical through an outlet directly on the end of the cut plant stem after the stem has been cut and before the stem is released by the clamping mechanism, the chemical dispenser dispensing liquid chemical through an opening in the cutting blade in a direction transverse to the plane of movement of the cutting blade, the opening being positioned so as to be aligned with the end of the gripped stem after it has been cut by the blade, the chemical dispenser including a chemical container for liquid chemical, a liquid dispensing nozzle mounted to the clipper at the dispenser outlet so as to direct liquid through the opening in the cutting blade when the cutting blade has cut through the plant stem, a liquid delivery mechanism comprising a conduit interconnecting the chemical container and the nozzle and a pump that pumps liquid chemical from the container to the nozzle and discharges liquid from the nozzle, the pump being actuated by moving the handles to their actuated position, wherein a predetermined amount of liquid is dispensed from the dispensing nozzle directly on the end of the cut stem, the liquid dispensing nozzle being mounted on a dispensing arm movably mounted adjacent the cutting blade, the dispensing arm having a first position wherein the nozzle is aligned with and directed through the opening in the cutting blade, the dispensing arm being resiliently biased by a spring to its first position, the dispensing arm being movable away from the first position to the second position upon contact with an upper portion of a stem when it is cut, the spring returning the dispensing arm to its first position after a stem has been cut and before liquid is dispensed from the liquid nozzle.

9. A plant clipper according to claim 8 wherein the handles are pivotally connected together for movement in a plane perpendicular to the plane of the gripping surfaces and cutting blade.

10. A plant clipper according to claim 8 wherein:

the container for liquid chemical includes an open outlet;

a cap is removably mounted on the outlet, the cap having an air inlet into the container through a one way valve positioned so as to admit air into the container, the cap having an outlet for dispensing liquid from the container;

a liquid feed conduit having an outlet end connected to the cap outlet and having an inlet end positioned in the container in position to receive chemical from the container, the feed conduit being flexible and having a weighted inlet end that is urged to gravitate to the lowest point in the container, such that the liquid is received through the inlet when the container is placed in different positions, the liquid delivery conduit being positioned outside the container and having an inlet in fluid communication with the cap outlet.

11. A plant clipper according to claim 8 wherein the handles are mounted at one end of an elongated handle and the clamping and cutting mechanisms are mounted at an opposite end of the elongated handle, at least one clipper handle being operably connected to the cutting mechanism by an elongated drive member that actuates the cutting mechanism in response to actuation of the clipper handle mechanism.

12. A plant clipper according to claim 11 wherein the drive member is a cable drive.

13. A plant clipper according to claim 11 wherein the blade assembly is mounted in a housing, an end of the elongated handle being attached to an upper portion of the housing, a foot extending downwardly from a lower end of the housing, the blade assembly being mounted in the housing at a position above the foot such that the foot supports the blade assembly at a position above the ground when the foot rests on the ground during operation of the clipper, thus protecting the blade assembly from contact with the ground during clipper operation.

14. A plant clipper according to claim 8 wherein the container of the chemical dispenser is mounted to the clipper adjacent the cutting mechanism, the container having an outlet that fastens into an inlet in the clipper, the container outlet communicating with the clipper inlet and the clipper inlet being in fluid communication with the liquid delivery mechanism, the pump being a bulb pump positioned between the container outlet and the nozzle, the clipper including an actuator that engages and actuates the bulb to pump chemical to the nozzle when the handles are actuated.

* * * * *